(12) United States Patent
Ishii et al.

(10) Patent No.: US 9,076,461 B2
(45) Date of Patent: Jul. 7, 2015

(54) OPTICAL INFORMATION RECORDING/REPRODUCING APPARATUS AND OPTICAL INFORMATION RECORDING/REPRODUCING METHOD

(71) Applicant: Hitachi-LG Data Storage, Inc., Tokyo (JP)

(72) Inventors: Toshiki Ishii, Tokyo (JP); Koichiro Nishimura, Tokyo (JP); Naohito Ikeda, Tokyo (JP); Kazuyoshi Yamazaki, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 14/244,620

(22) Filed: Apr. 3, 2014

(65) Prior Publication Data

US 2014/0301177 A1    Oct. 9, 2014

(30) Foreign Application Priority Data

Apr. 5, 2013 (JP) ................................ 2013-079111

(51) Int. Cl.
*G11B 7/00* (2006.01)
*G11B 7/0065* (2006.01)
*G11B 7/126* (2012.01)

(52) U.S. Cl.
CPC .............. *G11B 7/0065* (2013.01); *G11B 7/126* (2013.01)

(58) Field of Classification Search
None
See application file for complete search history.

(56) References Cited

U.S. PATENT DOCUMENTS

| 7,366,221 | B2 * | 4/2008 | Tanaka et al. | 372/102 |
| 7,397,571 | B2 * | 7/2008 | Krneta et al. | 356/520 |
| 7,580,433 | B2 * | 8/2009 | Tanaka et al. | 372/34 |
| 8,248,900 | B2 * | 8/2012 | Saito et al. | 369/47.15 |
| 2010/0074089 | A1 * | 3/2010 | Smith et al. | 369/103 |
| 2010/0157401 | A1 * | 6/2010 | Knittel | 359/15 |

FOREIGN PATENT DOCUMENTS

JP    2004-272268 A    9/2004
JP    2008277616 A  * 11/2008

* cited by examiner

*Primary Examiner* — Brenda Bernardi
(74) *Attorney, Agent, or Firm* — McDermott Will & Emery LLP

(57) ABSTRACT

An optical information recording/reproducing apparatus for recording an interference pattern between signal light and reference light information-multiplexed as a hologram in an optical information recording medium and for reproducing information recorded in the optical information recording medium on the basis of the recorded hologram with use of the reference light. The apparatus includes a light source for emitting light and a coherency controller for controlling a coherency of the light source. The apparatus controls the coherency controller in such a manner as to switch between a coherency required in a recording mode and a coherency required in a reproducing mode.

10 Claims, 20 Drawing Sheets

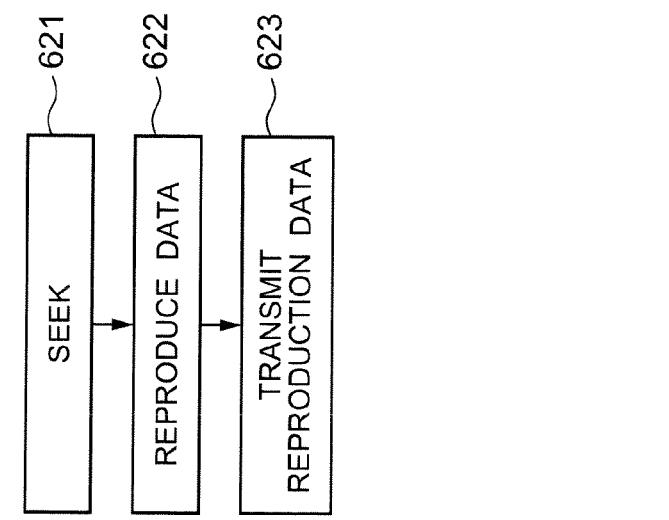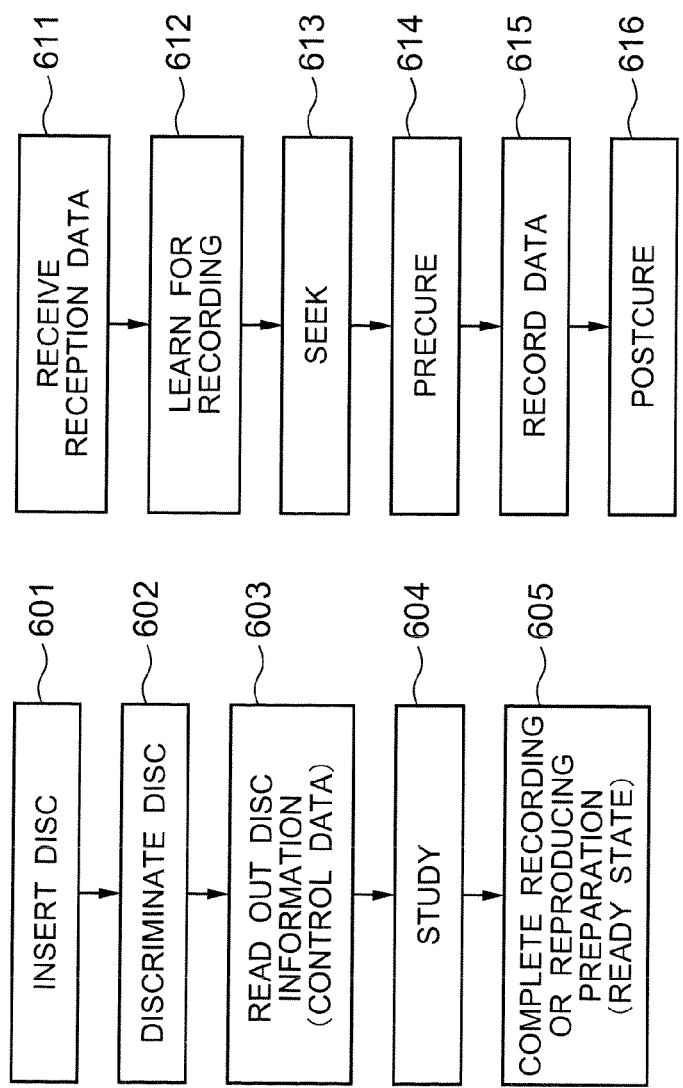

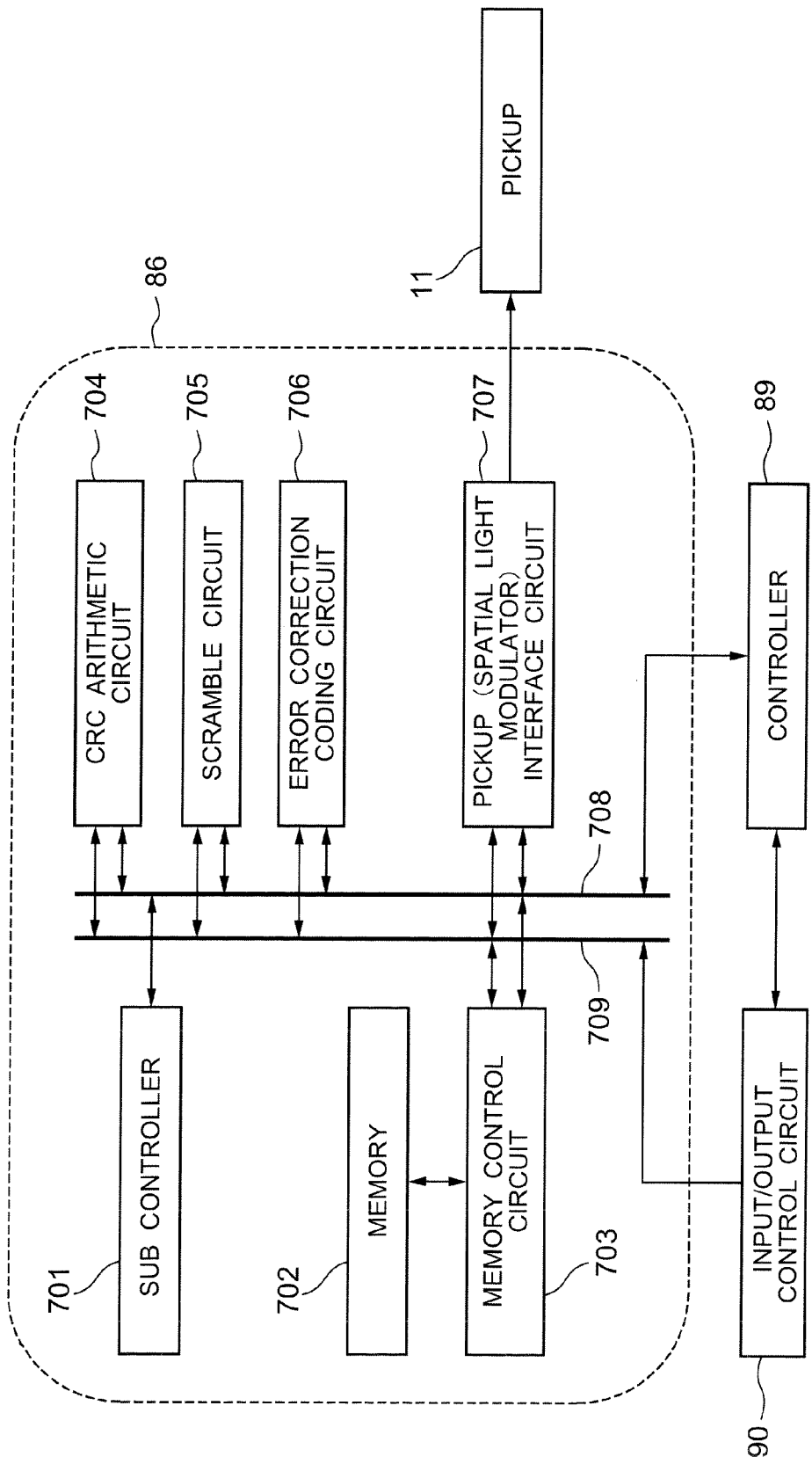

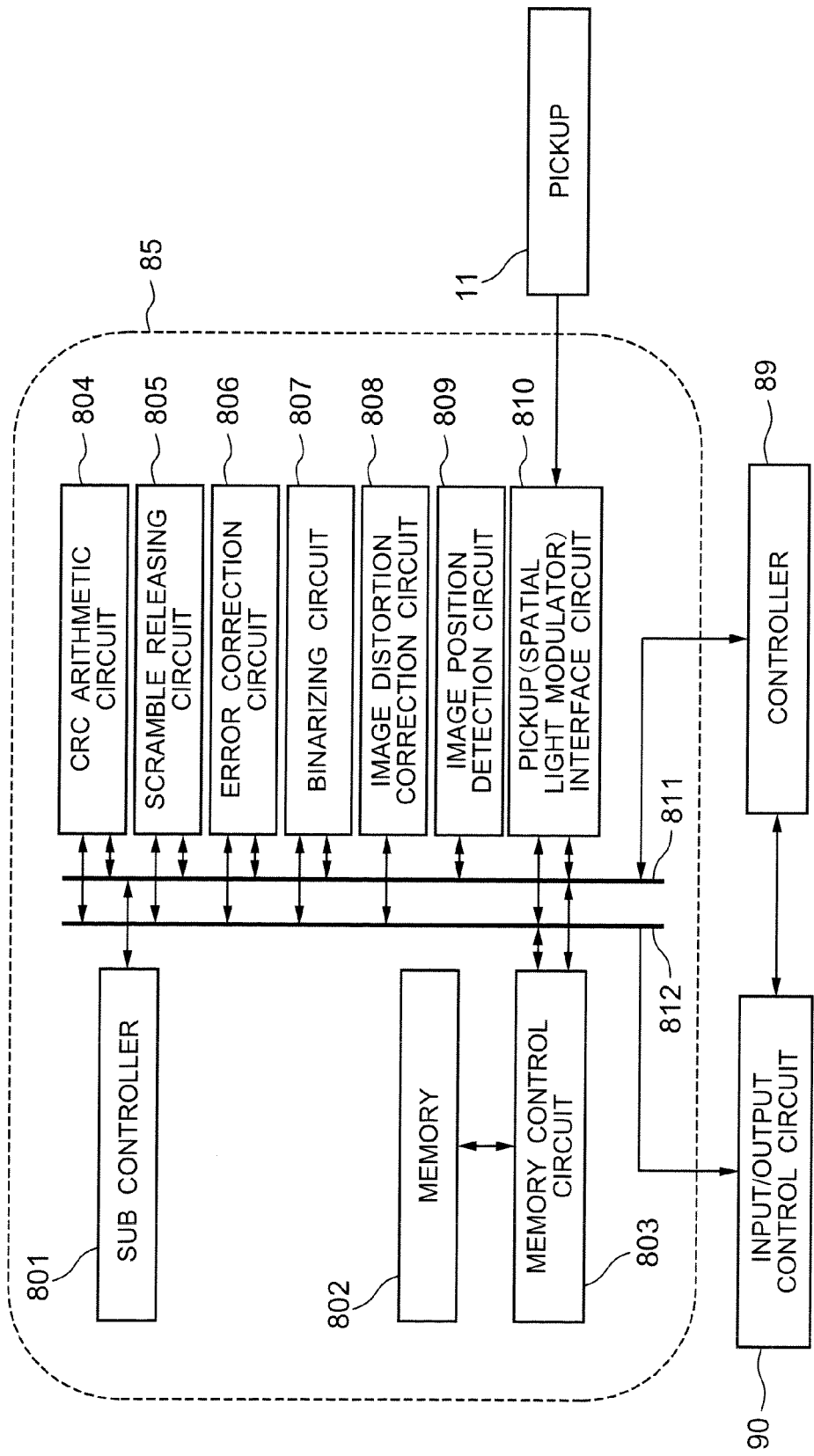

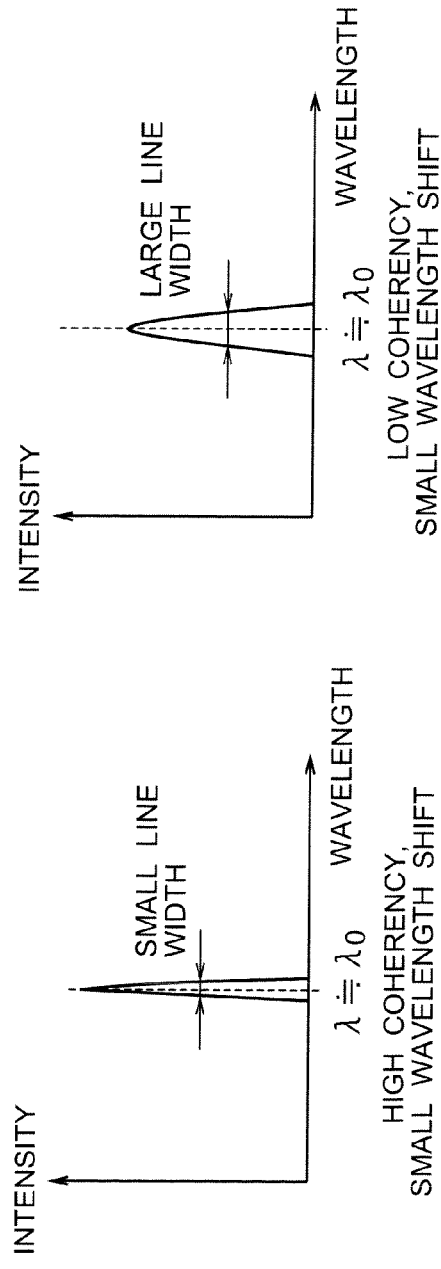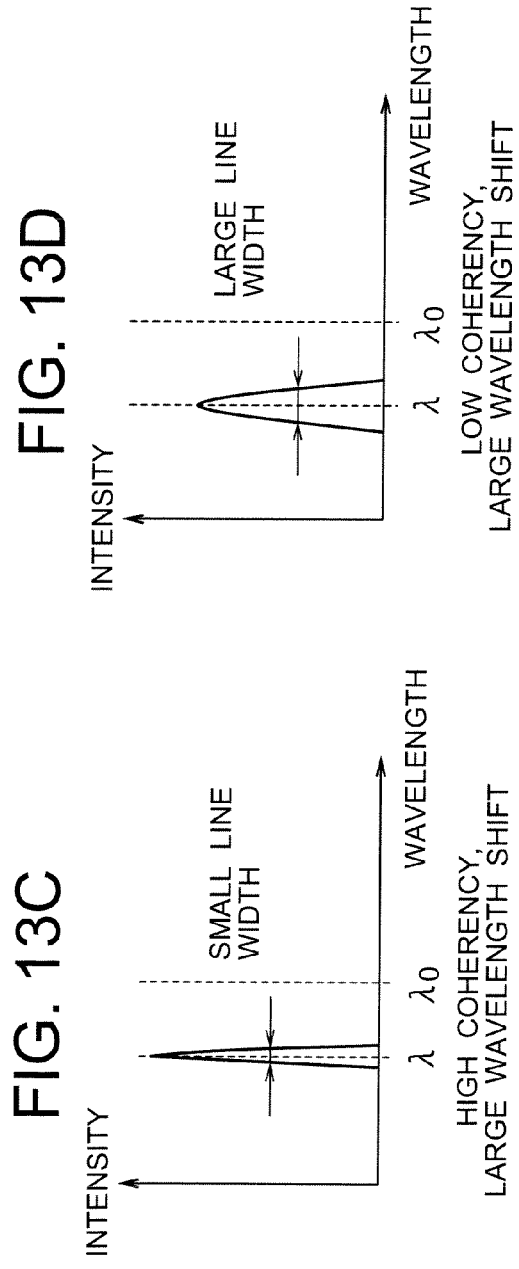

OPTICAL INFORMATION RECORDING/REPRODUCING APPARATUS AND OPTICAL INFORMATION RECORDING/REPRODUCING METHOD

INCORPORATION BY REFERENCE

The present application claims priority from Japanese application JP-2013-079111 filed on Apr. 5, 2013, the content of which is hereby incorporated by reference into this application.

BACKGROUND OF THE INVENTION

The present invention relates to an apparatus and method for recording and/or reproducing information on an optical information recording medium based on holography.

In recent years, an optical disc having a recording density of about 50 GB based on blu-ray disc specifications using a blue-violet semiconductor laser has reached commercial fruition even as a consumer-oriented product. In the future, it is desirable even for such an optical disc to have a large capacity of 100 GB to 1 TB nearly the same as a HDD (Hard Disk Drive).

In order to attain such an ultra-high density with use of an optical disc, however, it becomes necessary to use a higher-density technique based on a new scheme different from a higher-density technique using a shorter wavelength and using an objective lens having a higher NA (numerical aperture).

Among studies relating to next-generation storage techniques, much attention is focused on a holography technique for recording digital information based on holography.

A hologram recording technique refers to a technique for recording information on a recording medium by overlapping signal light having information on page data two-dimensionally modulated by a spatial light modulator with a reference light within the recording medium and by causing refractive index modulation within the recording medium by then-generated interference fringe pattern.

In an information reproduction mode, irradiation of the reference light used in a recording mode on the recording medium causes a holography already recorded in the recording medium to act like a diffraction grating and to produce diffraction light. The diffraction light is reproduced as the same light including the recorded signal light and phase information.

The reproduced signal light is detected two-dimensionally at a high speed with use of such an optical detector as a CMOS or a CCD. In this way, by the hologram recording technique, two-dimensional information can be collectively recorded on an optical recording medium with use of a single hologram, the recorded information can be reproduced, and a plurality of pieces of page data can be overwritten at a given location on the recording medium. As a result, a large capacity of information can be recorded and reproduced at a high speed on the recording medium.

One of the holography recording techniques is disclosed, for example, in JP-A-2004-272268. This publication describes a technique for recording information by multiplexing holograms.

SUMMARY OF THE INVENTION

In a recording/reproducing apparatus for recording and reproducing digital information on an optical information recording medium based on holography, a laser having a high coherency is required as a light source. Further, a photopolymer material is a promising material as the material of an optical information recording medium. In order to cope with expansion/shrinkage of the photopolymer material caused by variations in the temperature of the material, however, the light source is required to be variable in its wavelength. As a light source for satisfying such a requirement, there is a variable wavelength laser of an external-resonator type. In order to stable secure a high coherency in the external resonator type of variable wavelength laser, it is necessary to finely adjust its wavelength and power. However, when a high coherency is preferentially secured, a desired wavelength cannot be obtained in some cases. When consideration is paid to temperature variations of the recording medium or to shrinkage thereof in its recording mode, on the other hand, there is a problem that a high quality of reproduction of page data requires a high wavelength accuracy.

The above problem can be resolved by the inventions recited, for example, in Claims.

In accordance with the present invention, there is provided a highly reliable optical information recording/reproducing apparatus.

BRIEF DESCRIPTION OF THE DRAWINGS

FIGS. 6A to 6C schematically show embodiments of a flow of operations in the optical information recording/reproducing apparatus;

FIG. 7 schematically shows an embodiment of a signal generation circuit in the optical information recording/reproducing apparatus;

FIG. 8 schematically shows an embodiment of a signal processing circuit in the optical information recording/reproducing apparatus;

FIGS. 13A to 13D schematically show optical spectra when the coherency is high and low;

DESCRIPTION OF THE EMBODIMENTS

Embodiments of the present invention will be explained with reference to the attached drawings.

Embodiment 1

Figure 2:
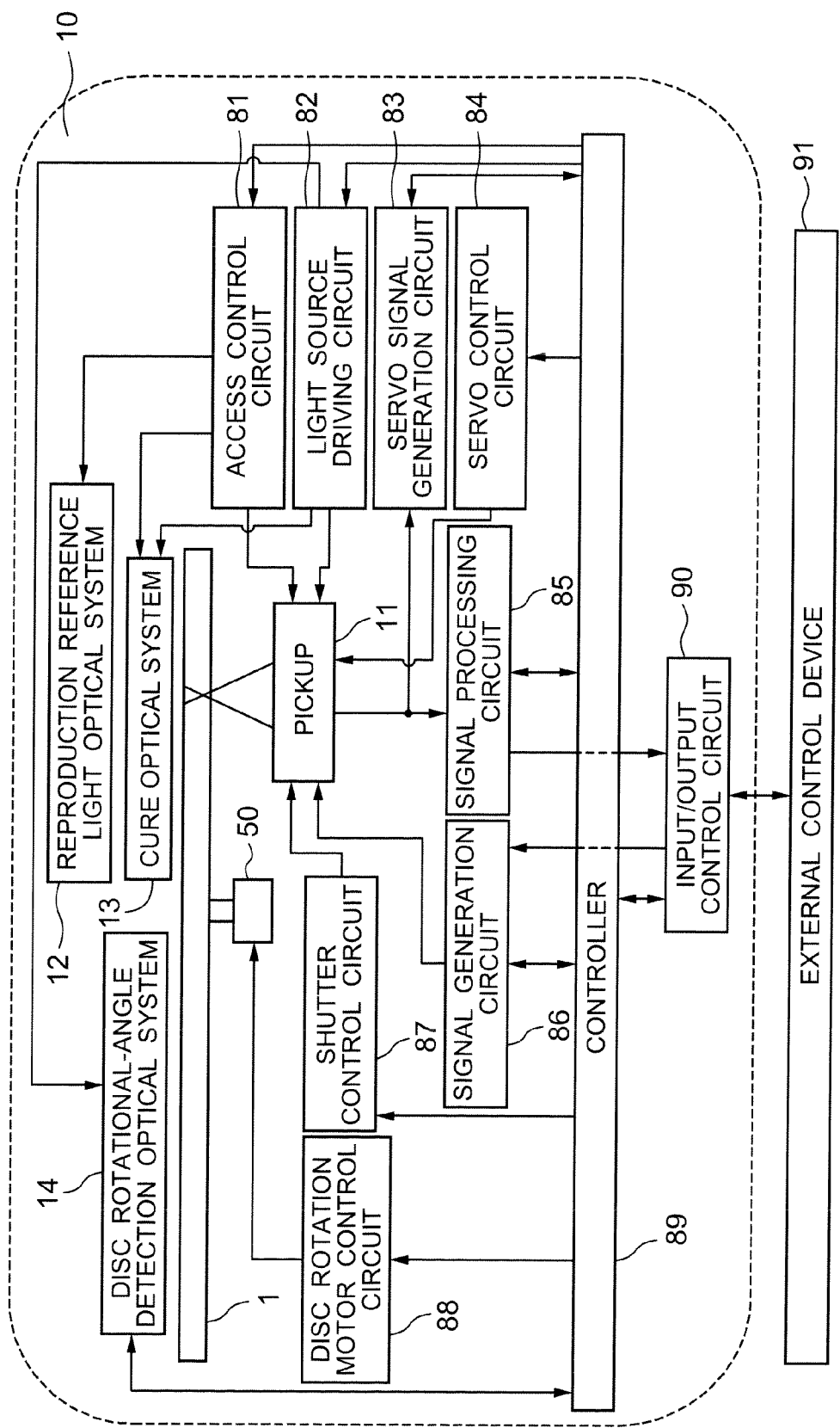
FIG. 2 schematically shows an embodiment of an optical information recording/reproducing apparatus.

The first embodiment of the present invention will be explained according to the attached drawings. FIG. 2 shows a block diagram of a recording/reproducing apparatus for an optical information recording medium for recording and/or reproducing digital information based on holography.

An optical information recording/reproducing apparatus 10 is connected via an input/output control circuit 90 to an external control device 91. When recording of information is desired, the optical information recording/reproducing apparatus 10 receives a recording information signal from the external control device 91 under control of the input/output control circuit 90. When reproducing of information is desired, the optical information recording/reproducing apparatus 10 transmits the reproduced information signal to the external control device 91 under control of the input/output control circuit 90.

The optical information recording/reproducing apparatus 10 includes a pickup 11, a reproduction reference light optical system 12, a cure optical system 13, an optical system 14 for detection of a disc rotational angle, and a rotary motor 50. The apparatus 10 is arranged so that a recording medium 1 can be rotated by the rotary motor 50.

The pickup 11 plays a role of recording digital information on the optical information recording medium 1 based on holography when reference light and signal light are emitted to the recording medium. At this time, an information signal to be recorded is sent to a spatial light modulator within the pickup 11 via a signal generation circuit 86 under control of a controller 89.

When it is desired to reproduce information already recorded on the optical information recording medium 1, a light wave to be directed onto the optical information recording medium in a direction opposite to the case when the reference light emitted from the pickup 11 is recorded, is generated by the reproduction reference light optical system 12. Reproduction light to reproduced by the reproduction reference light is detected by an optical detector (to be explained later) within the pickup 11, and then reproduced by a signal processing circuit 85 as a signal.

Irradiation times of the reference and signal light applied on the optical information recording medium 1 can be adjusted by controlling an opening/closing time of a shutter within the pickup 11 via a shutter control circuit 87 under control of the controller 89.

The cure optical system 13 plays a role of generating an optical beam for use of pre-cure and post-cure of the optical information recording medium 1. The pre-cure means a preceding process of previously directing a predetermined light beam to a desired position in the optical information recording medium 1 prior to the direction of the reference and signal light to the desired position when information is recorded at the desired position. The post-cure means a post process of directing a predetermined light beam to the desired position within the optical information recording medium 1 after recording of the information at the desired position to make additional recording at the desire position be disable.

The disc rotational-angle detection optical system 14 is used to detect a rotational angle of the optical information recording medium 1. When it is desired to adjust the optical information recording medium 1 at a predetermined rotational angle, a signal corresponding to the rotational angle can be detected by the disc rotational-angle detection optical system 14, and the rotational angle of the optical information recording medium 1 can be controlled with use of the detected signal via a disc rotation motor control circuit 88 under control of the controller 89.

A predetermined light-source driving current can be supplied from a light source driving circuit 82 to the pickup 11, the cure optical system 13, and also to a light source within the disc rotational-angle detection optical system 14 to emit light beams of predetermined light quantities from the respective light sources.

The pickup 11 and the cure optical system 13 are provided each with a mechanism which can slide the pickup or the system in a radial direction of the optical information recording medium 1 up to a desired position, and control of the position is carried out by an access control circuit 81.

Meanwhile, in a recording technique based on a principle of angle multiplexing of holography, an allowable error to a shift in a reference light angle tends to become very small.

For this reason, it becomes necessary to provide a mechanism for detecting a shift in the reference light angle within the pickup 11, to generate a servo control signal at a signal generation circuit 83, and to provide a servo mechanism for correcting the shift via a servo control circuit 84 within the optical information recording/reproducing apparatus 10.

The pickup 11, the cure optical system 13, and the disc rotational-angle detection optical system 14 may be combined to have an arrangement of several optical systems or combined as a single optical system for simplification.

Figure 3:
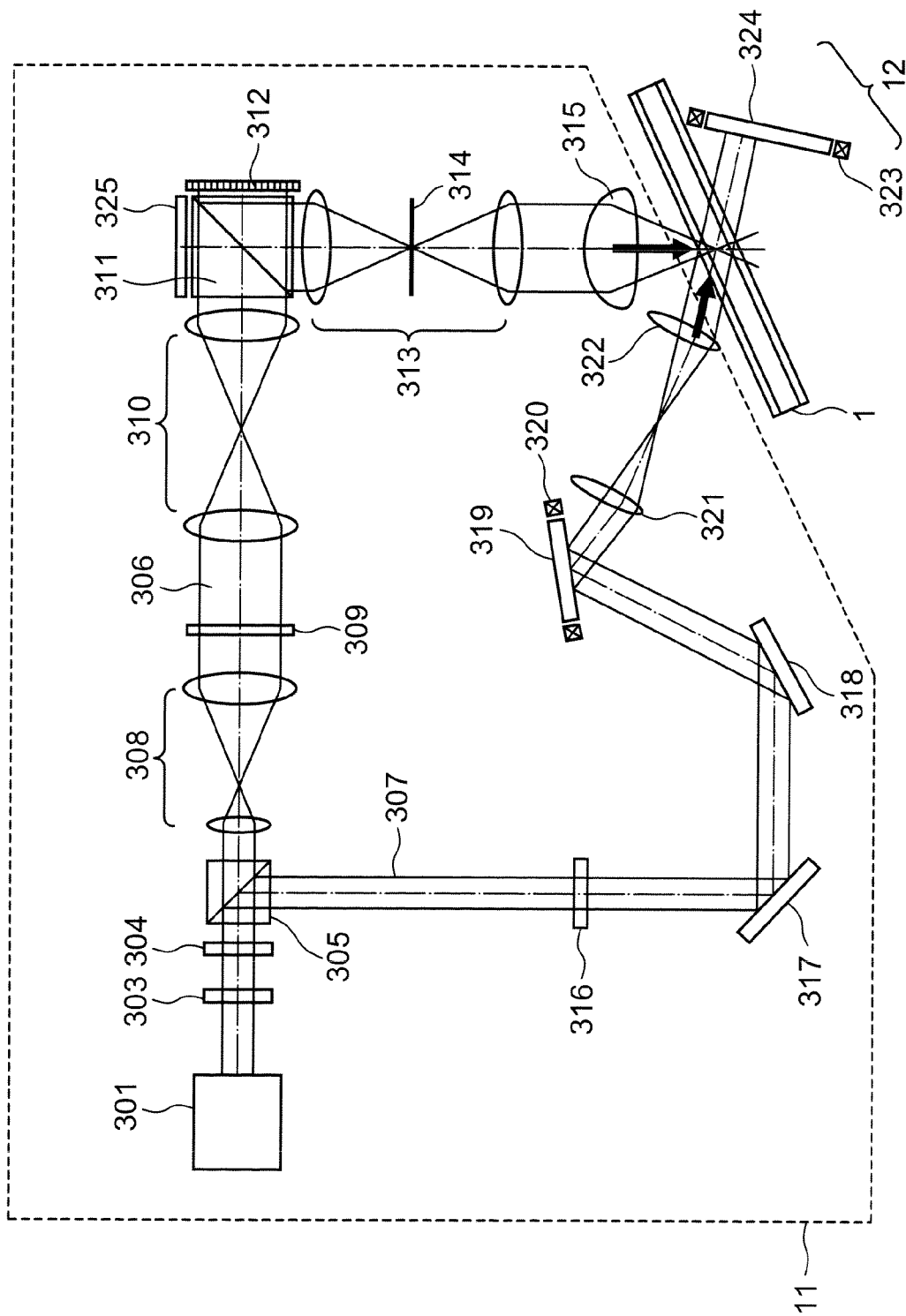
FIG. 3 schematically shows a recording principle of an embodiment of a pickup in the optical information recording/reproducing apparatus.

FIG. 3 shows a recording principle of an example of a basic optical system arrangement of the pickup 11 in the optical information recording/reproducing apparatus 10. A light beam emitted from a variable wavelength laser 301 of an external resonator type as an example of a light source is directed into a shutter 303. When the shutter 303 is opened, the light beam is passed through the shutter 303 and through an optical element 304 formed, for example, as a ½ wavelength plate, subjected at the optical element to polarization direction control so that a light quantity ratio of P and S polarization becomes a desired value, and then directed into the PBS (Polarization Beam Splitter) prism 305.

A light beam passed through the PBS prism 305 acts as signal light 306, the light beam is enlarged in diameter by a beam expander 308, passed through a phase mask 309, a relay lens 310 and a PBS prism 311, and then directed into a spatial light modulator 312.

Signal light having information added by the spatial light modulator 312 is reflected by the PBS prism 311, and then propagated to a relay lens 313 and a spatial filter 314. Thereafter, the signal light is focused on the optical information recording medium 1 by an objective lens 315.

Meanwhile, a light beam reflected by the PBS prism 305 acts as reference light 307, the reference light is set by a polarization direction conversion element 316 to have a predetermined polarization direction according to the recording or reproducing mode, passed through a minor 317 and a minor 318, and then directed to a galvanometer mirror 319.

Since the galvanometer minor 319 can be adjusted in angle by an actuator 320, the incident angle of the reference light passed through a lens 321 and a lens 322 with respect to the optical information recording medium 1 can be set at a desired angle. In this connection, in order to se the incident angle of the reference light, an element for converting the wave front of the reference light may be employed in place of the galvanometer mirror.

When the signal light and the reference light are directed onto the optical information recording medium 1 to be overlapped with each other in this way, a interference fringe pattern is formed within the recording medium, the pattern is written in the recording medium, thereby recording the information. Further, since the incident angle of the reference light directed to the optical information recording medium 1 can be changed by the galvanometer minor 319, angle multiplexing recording can be achieved.

With respect to holograms recorded in the same area with varied reference light angles, a hologram corresponding to each reference light angle will be referred to as a page and a set of pages angle-multiplexed in the same area will be referred to as a book, hereinafter.

Figure 4:
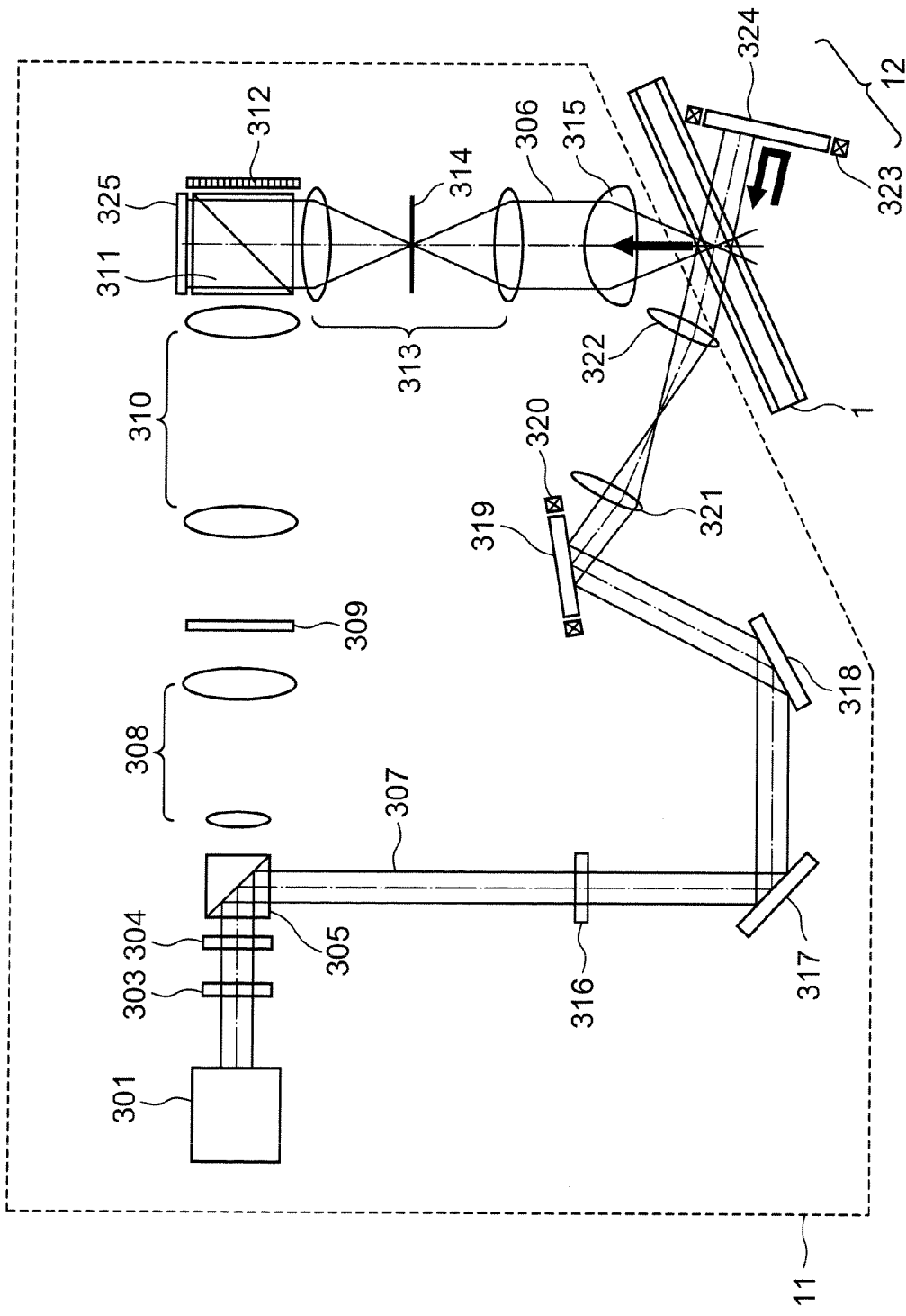
FIG. 4 schematically shows a reproducing principle of the embodiment of the pickup in the optical information recording/reproducing apparatus.
Figure 5:
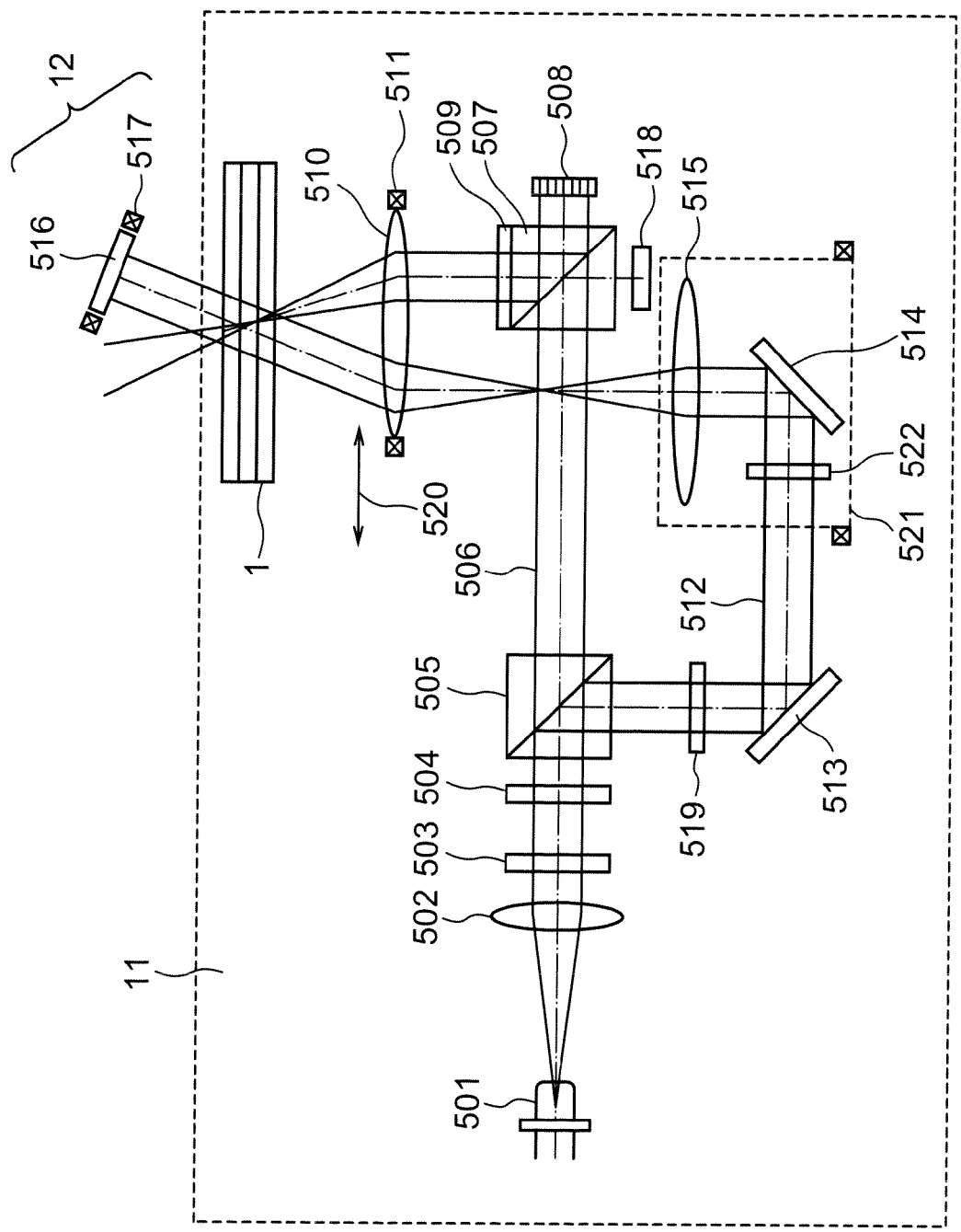
FIG. 5 schematically shows another embodiment of the pickup in the optical information recording/reproducing apparatus.

FIG. 4 shows a reproduction principle in an example of the basic optical system arrangement of the pickup 11 in the optical information recording/reproducing apparatus 10. When it is desired to reproduce recorded information, reference light is directed to the optical information recording medium 1, a light beam passed through the optical information recording medium 1 is reflected by a galvanometer mirror 324 angle-adjustable by an actuator 323m thus generating reproduction reference light, as mentioned above.

Reproduction light reproduced based on the reproduction reference light is propagated to the objective lens 315, the relay lens 313 and then the spatial filter 314. Thereafter, the reproduction light is passed through the PBS prism 311, and then directed to an optical detector 325 to reproduce the recorded signal. Though an image pickup element such as a CMOS image sensor or a CSD image sensor can be used as the optical detector 325, the optical detector may be any element as long as the element can reproduce page data.

FIGS. 6A to 6C show flows of recording and reproducing operations in the optical information recording/reproducing apparatus 10.

In this case, explanation will be made, in particular, as to the recording and reproducing flows based on holography.

FIG. 6A shows the operational flow until preparation of recording or reproduction is completed after the optical information recording medium 1 is loaded into the optical information recording/reproducing apparatus 10, FIG. 6B shows the operational flow after the completion of the preparation until information is recorded in the optical information recording medium 1, and FIG. 6C shows the operational flow from the preparation completion until information already recorded in the optical information recording medium 1 is reproduced.

As shown in FIG. 6A, when a medium disc is loaded (step 601), the optical information recording/reproducing apparatus 10 judges whether or not the loaded disc is a medium for recording or reproducing digital information, for example, based on holography (step 602).

When the optical information recording/reproducing apparatus 10 determines the disc is an optical information recording medium for recording or reproducing digital information based on holography as a result of the disc judgment, the apparatus 10 read out control data provided in the optical information recording medium (step 603), and acquires, for example, information about the optical information recording medium and various set requirements in recording and reproducing modes.

After reading the control data, the optical information recording/reproducing apparatus 10 performs various types of adjustments according to the control data or studying operation relating to the pickup 11 (step 604), and completes preparation of recording or reproduction (step 605).

As shown in FIG. 6B, in the operational flow from the completion of preparation until recording, the apparatus first receives data to be recorded (step 611), and sends information according to the received data to the spatial light modulator 312 within the pickup 11.

Thereafter, in order to record a high quality of information in the optical information recording medium, the apparatus previously performs, as necessary, studying operation for various sorts of recording, including optimization of the power of the external resonator type variable wavelength laser 301 and the optimization of an exposure time by the shutter 303 (step 612).

Thereafter, in a seeking operation (step 613), the apparatus controls the access control circuit 81 and locates the pickup 11 and the cure optical system 13 at predetermined positions on the optical information recording medium.

Next, a light beam emitted from the cure optical system 13 is used to pre-cure a predetermined area and records data with use of the reference light (step 614) and the signal light emitted from the pickup 11 (step 615).

After recording the data, the apparatus post-cures the medium using a light beam emitted from the cure optical system 13 (step 616). The apparatus may verify the data, as necessary.

As shown in FIG. 6C, in the operational flow from the completion of preparation until the recorded information is reproduced, the apparatus first performs seeking operation (step 621), controls the access control circuit 81, and locates the positions of the pickup 11 and reproduction reference light optical system 12 at predetermined positions on the optical information recording medium.

Thereafter, the apparatus emits reference light from the pickup 11, reads out information already recorded in the optical information recording medium (step 622), and transmits the reproduction data (step 623).

Figure 9A:
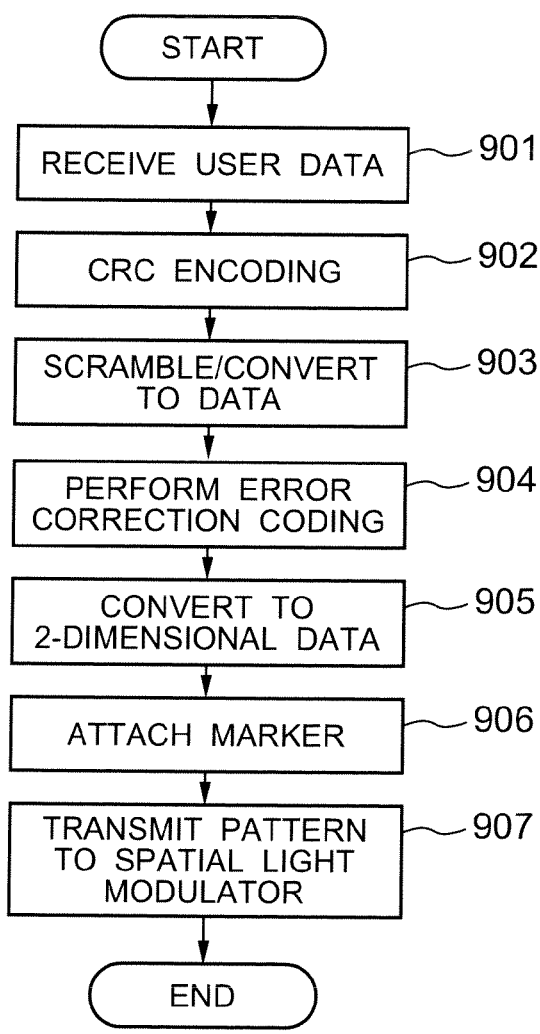
FIGS. 9A and 9B schematically show embodiments of a flow of operations in the signal generation circuit and in the signal processing circuit.
Figure 9B:
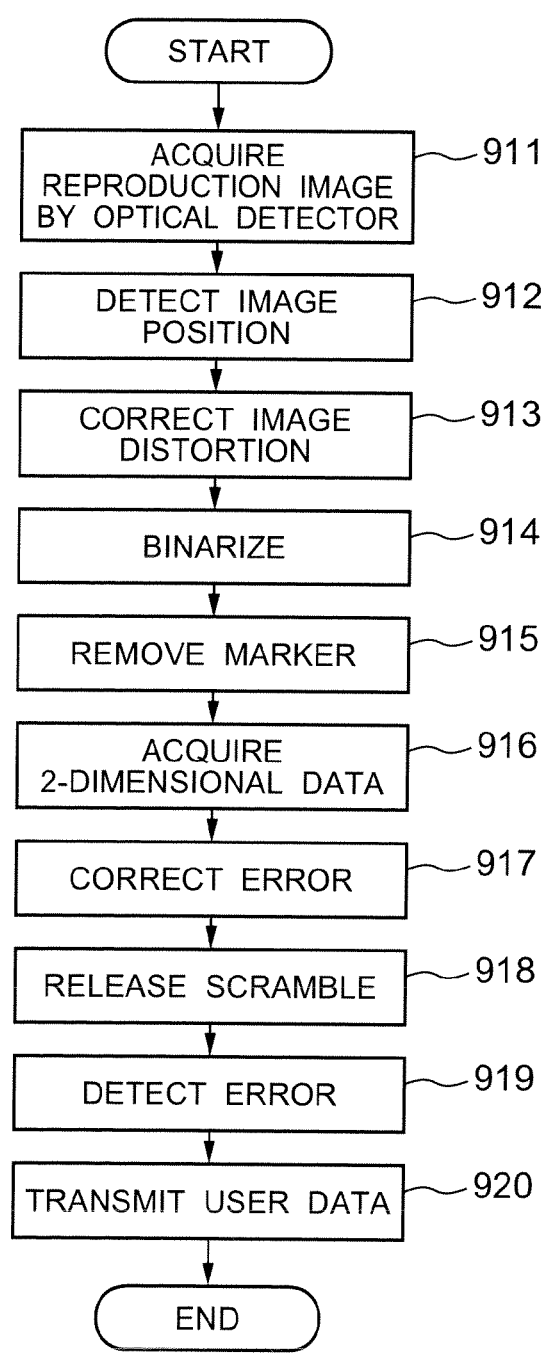

FIGS. 9A and 9B show data processing flows in recording and reproducing modes, wherein FIG. 9A shows the recording data processing flow of the signal generation circuit 86 after the input/output control circuit 90 receives recording data (step 611) until the received data is converted to two-dimensional data on the spatial light modulator 312, and FIG. 9B shows the reproduction data processing flow of the signal processing circuit 85 after detection of the two-dimensional data at the optical detector 325 until the input/output control circuit 90 transmits the reproduction data (step 623).

The data processing in the recording mode will be explained by using FIG. 9A. When the apparatus receives user data (step 901), the apparatus divides the data into a plurality of data strings, performs CRC (Cyclic Redundancy Check) operation over each of the data strings so as to enable error detection in the reproducing mode (step 902), sets the number of on-pixels to be nearly equal to the number of off-pixels, performs such scrambling operation as to add a pseudo-random number sequence to the data strings for the purpose of preventing the repetition of the same pattern (step 903), and then performs error correction coding operation such as reed-Solomon coding so as to enable error correction in the reproducing mode (step 904). Next, the data strings are converted to two-dimensional data of M×N, and the two-dimensional data is repeated by a number of times corresponding to one-page data to form two-dimensional data corresponding to one page (step 905). A marker as a reference in the image position detection or in the image distortion correction in the reproducing mode is attached to the thus-formed two-dimensional data (step 906), and the marker-added data is transmitted to the spatial light modulator 312 (step 907).

Explanation will next be made as to the data processing flow in the reproducing mode with reference to FIG. 9B. Image data detected by the optical detector 325 is transmitted to the signal processing circuit 85 (step 911). A position of the image is detected using the marker included in the image data (step 912) as a reference, and distortions such as the tilt, magnification distortion of the image are corrected (step 913), the corrected image is subjected to binarizing operation (step 914), the marker is removed from the image (step 915) to thereby acquire two-dimensional data corresponding to one page (step 916). The two-dimensional data obtained in such a manner is converted to a plurality of data strings, and then the data strings are subjected to error correcting operation to thereby remove a parity data string (step 917). The string data is next subjected to scramble releasing operation (step 918) and to error detecting operation based on CRC (step 919) to remove a CRC parity, and then user data is transmitted via the input/output control circuit 90 (step 920).

FIG. 7 is a block diagram of the signal generation circuit 86 in the optical information recording/reproducing apparatus 10.

When input of the user data to the input/output control circuit 90 is started, the input/output control circuit 90 notifies the controller 89 of the fact that input of the user data was started. The controller 89 receives this notification and instructs the signal generation circuit 86 to record data corresponding to one page received from the input/output control circuit 90. The processing instruction from the controller 89 is informed via a control line 708 to a sub controller 701 provided within the signal generation circuit 86. When receiving the processing instruction, the sub controller 701 controls each signal processing circuit via the control line 708. The sub controller controls each signal processing circuit to cause user data inputted from the input/output control circuit 90 via a data line 709 to a memory control circuit 703 to be stored in a memory 702. When the user data stored in the memory 702 reaches a predetermined size, the sub controller causes a CRC arithmetic circuit 704 to perform CRC operation over the user data. Next, the sub controller causes a scramble circuit 705 to perform scrambling operation by adding a pseudo random number data sequence to the CRC-processed data, and also causes an error correction coding circuit 706 to perform error correction coding operation by adding a parity data string. Finally, a pickup interface circuit 707 reads out sequentially data subjected to the error correction coding operation from the memory 702 in the order of array of two-dimensional data on the spatial light modulator 312, adds a marker as a reference in the reproducing mode thereto, and then transmits the two-dimensional data to the spatial light modulator 312 within the pickup 11.

FIG. 8 is a block diagram of the signal processing circuit 85 of the optical information recording/reproducing apparatus 10.

When the optical detector 325 within the pickup 11 detects image data, the controller 89 instructs the signal processing circuit 85 to produce data corresponding to one page sent from the pickup 11. The processing instruction from the controller 89 is notified via a control line 811 to a sub controller 801 provided within the signal processing circuit 85. When receiving this notification, the sub controller 801 controls respective signal processing circuits via the control line 811 in such a manner that the signal processing circuits are parallelly operated. First, the sub controller causes a memory control circuit 803 to store in a memory 802 image data received via a pickup interface circuit 810 from the pickup 11 via a data line 812. When the data stored in the memory 802 reaches a predetermined size, the sub controller causes an image position detection circuit 809 to detect a marker from the image data stored in the memory 802 and to extract an effective data range. The sub controller next causes an image distortion correction circuit 808 to correct distortions such as tilt, magnification and distortion of an image with use of the detected marker, and to convert the image data to an expected size of two-dimensional data. The sub controller causes a binarizing circuit 807 to perform binarizing operation over each bit of the size-converted bit data of bits as two-dimensional data to determine whether each bit is "0" or "1" and to stores the data in the memory 802 in the form of an output array of reproduction data. Then the sub controller causes an error correction circuit 806 to correct an error contained in each data string, also causes a scramble releasing circuit 805 to release a scramble of adding a pseudo random number data string thereto, and then causes a CRC arithmetic circuit 804 to confirm that no error is contained in the user data on the memory 802. Thereafter, user data is transmitted from the memory 802 to the input/output control circuit 90.

Figure 10:
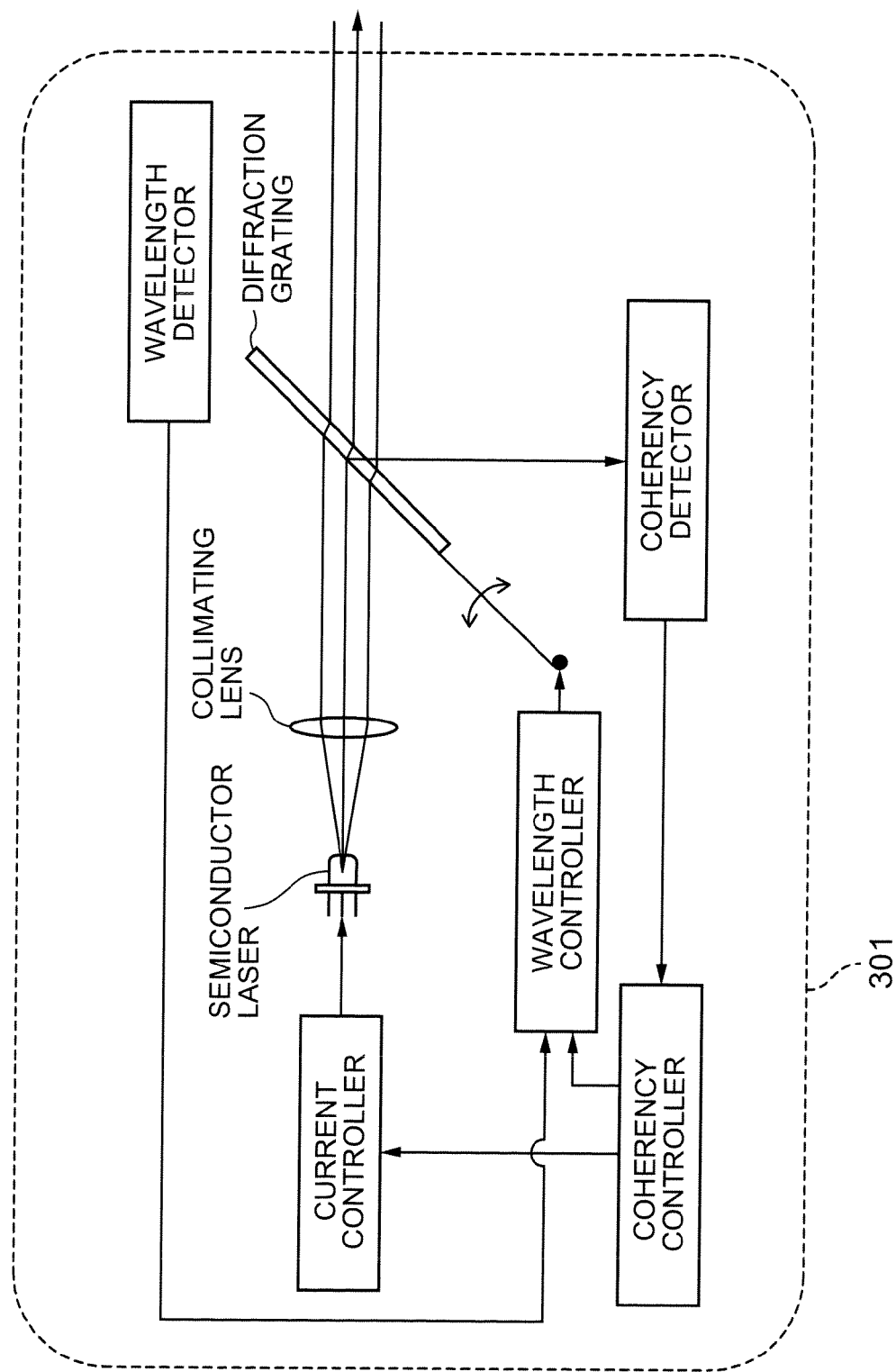
FIG. 10 schematically a configuration of an external resonator type of variable wavelength laser.

FIG. 10 schematically shows a structure of the external resonator type variable wavelength laser 301 as an example of a light source. Light emitted from a semiconductor laser becomes collimated light by a collimating lens. An external resonator type variable wavelength laser has a resonator structure between a diffraction grating and a semiconductor laser to oscillate in a single mode. The external resonator type variable wavelength laser can control the power of light emitted therefrom by controlling a current flowing through the semiconductor laser under control of a current controller, and can control the wavelength of light emitted therefrom by controlling the angle of the diffraction grating under control of a wavelength controller. The wavelength of light can be detected by a wavelength detector, and the wavelength detector can be formed to include an LED and a light position sensor as an example. Further, a coherency detector may be provided to determine a coherency by monitoring part of light passed through the diffraction grating. The coherency of the external resonator type variable wavelength laser may be reduced in some cases. However, the coherency of the laser can be increased by controlling the current controller or the wavelength controller under control of a coherency controller to finely adjust the current flowing through the semiconductor laser or the angle of the diffraction grating. In this connection, when the current flowing through the semiconductor laser is finely adjusted, the power of light emitted therefrom is varied, whereas, when the angle of the diffraction grating is finely adjusted, the wavelength of light emitted therefrom is varied. When the angle of the diffraction grating is varied with the current flowing through the semiconductor laser being varied, a high or low coherency state appears in the laser. On the other hand, even when the current flowing through the semiconductor laser is varied with the angle of the diffraction grating being varied, a high or low coherency state appears in the laser. When one of the above parameters is varied, the laser may have a high coherency state in some cases. For this reason, it becomes necessary to provide predetermined allowable ranges of set errors for the both parameters, change the both parameters in the allowable ranges and search for a high coherency state.

Figure 11:
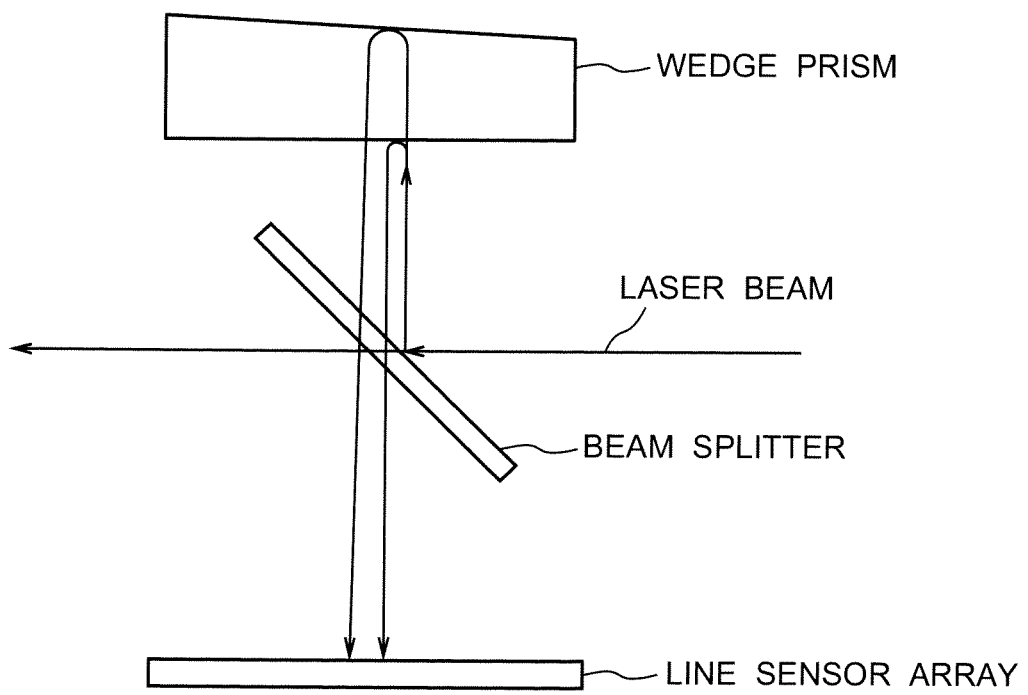
FIG. 11 schematically shows an example of an arrangement of a coherency detector.

FIG. 11 schematically shows an example of a structure of the coherency detector. Light is partially reflected by a beam splitter, and reflected by first and second surfaces of a wedge prism. Since light reflected by the first surface of the wedge prism and light reflected by the second surface thereof are slightly different in angle, interference of the two light enables the user to observe interference fringes. A coherency can be detected by positioning a line sensor array at a location where interference fringes are formed and by calculating the contrast of the interference fringes. A high coherency state means a state in which the length of a coherency is large or a wave packet (one train of continuous coherent wave) is long, a coherence is high and interference fringes have a high contrast. The contrast of the interference fringes is called visibility, clearness, or modulation degree.

Figure 12A:
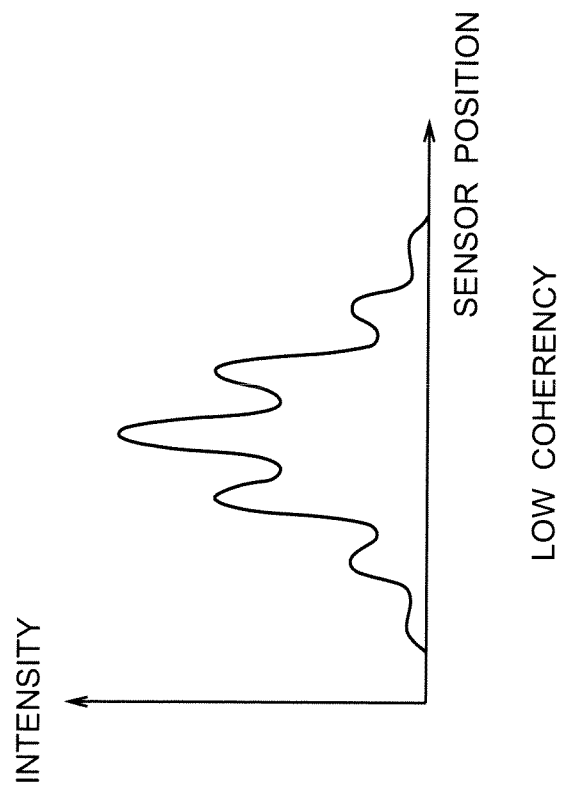
FIGS. 12A and 12B are schematic graphs obtained when a coherency is high and low.
Figure 12B:
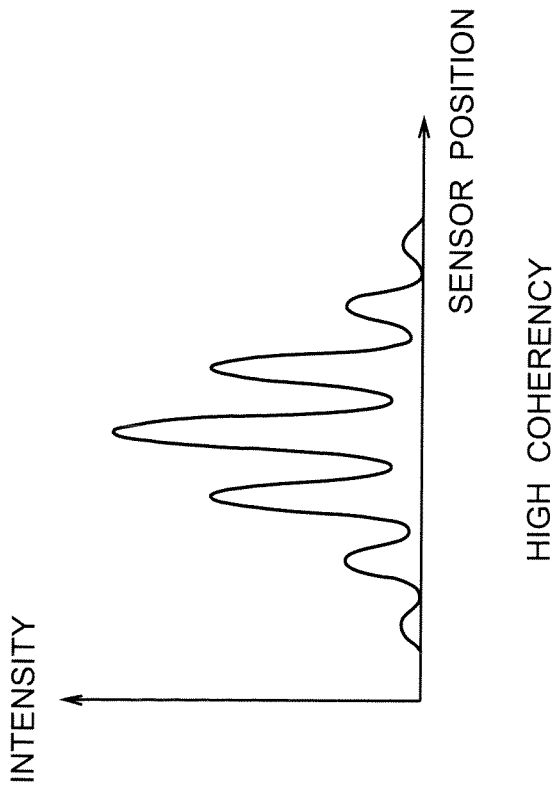

FIGS. 12A and 12B schematically show variations in the intensity of interference fringes observed by a line sensor array of FIG. 11 with respect to high and low coherencies. FIG. 12A is the case when the coherency is high, in which a contrast between bright and dark parts in the interference fringes is high. FIG. 12B is the case when the coherency is low, in which a contrast between bright and dark parts in the interference fringes is low. In an article in WILEY entitled "Holographic Data Storage", written by Keven Curtis, et al., a value detected by a sensor is converted to an index called a contrast ratio, and the higher the contrast ratio is the higher the coherency is.

In this connection, the arrangement of a coherency detector or the calculation method is not limited to those of FIG. 11 and FIGS. 12A and 12B. For example, the coherency may be detected by providing an arrangement similar to an optical spectrum analyzer to the coherency detector and by calculating a line width.

FIGS. 13A to 13D schematically show optical spectra when a coherency is high and low. FIGS. 13A to 13D shows light observation states with wavelength in the abscissa axis and power in the ordinate axis. Such observation can be achieved by using, for example, an optical spectrum analyzer. FIG. 13A or FIG. 13C is the case when the coherency is high, in which a line width is small. FIG. 13B or 13D is the case when the coherency is low, in which a line width is large. Accordingly, the optical coherency can be observed by extracting part of light used in the recording or reproducing mode and by observing it with use of the optical spectrum analyzer. In FIGS. 13A to 13D, a middle value of a wavelength to be observed is shown by λ and a wavelength to be set is shown by λ0. FIG. 13A or FIG. 13B shows the case when wavelength λ is nearly the same as wavelength λ0 and a shift between the wavelengths is small; whereas, FIG. 13C or 13D shows the case when a difference between the wavelengths λ and λ0 is large and thus a wavelength shift is large. It will be assumed in the present specification that a high set accuracy state of wavelength is when a wavelength shift is small as shown in FIG. 13A or 13B, and that a low set accuracy state of wavelength is when a wavelength shift is large as shown in FIG. 13C or 13D. It is further assumed that a large fluctuation of wavelength means a low set accuracy state of wavelength.

Figure 14:
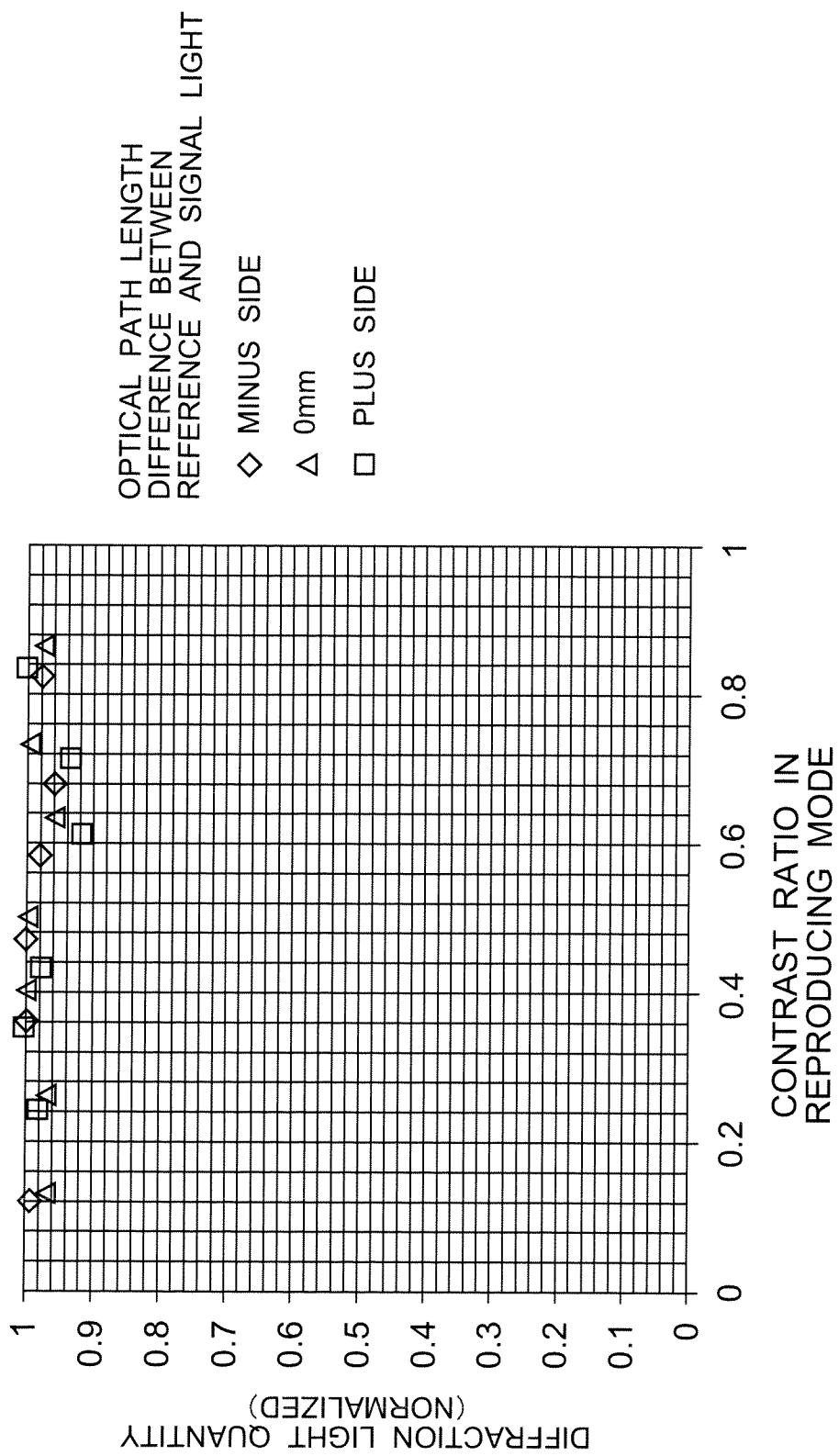
FIG. 14 is a graph showing a relationship between a coherency in a reproduction mode and a light quantity in a reproduced hologram.

FIG. 14 is a graph showing results when a relationship between a coherency and a light quantity of hologram reproduced in the reproducing mode is measured. An abscissa axis in the graph represents contrast ratio as a value having a correlation with the coherency. An ordinate axis represents a light quantity of diffraction reproduced based on the reference light and normalized with a maximum value. In this case, a diffraction light quantity was measured by changing a contrast ratio in the reproducing mode with respect to one hologram. FIG. 14 shows that measurement is carried out by changing a difference in optical path length between the reference light and the signal light, but a constant quality of reproduction can be achieved for any contrast ratio, because, a correlation between the contrast ratio and the diffraction light quantity is weak for all cased of the optical path length difference is at any of a negative side, 0 mm, and positive side.

Figure 15:
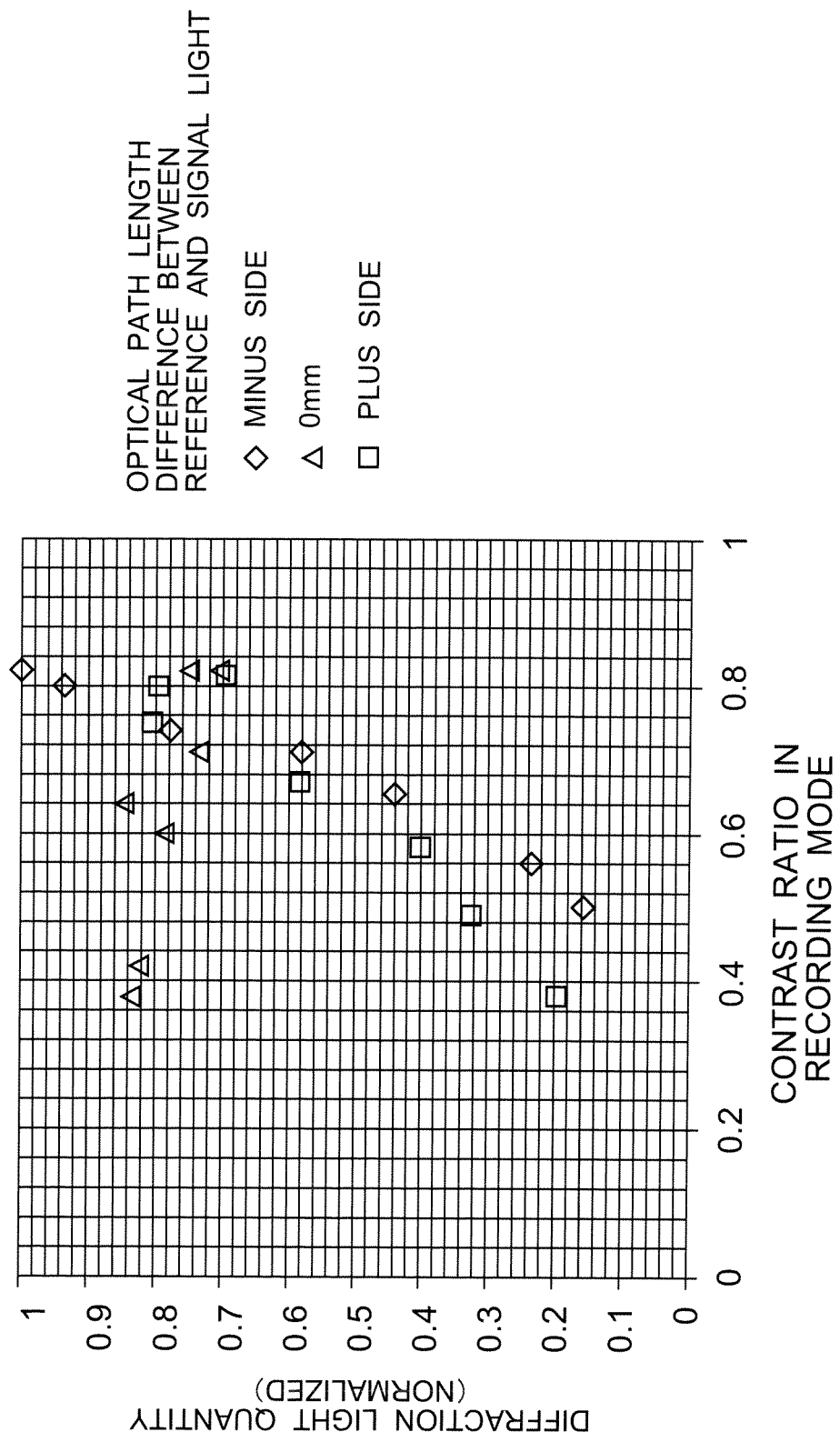
FIG. 15 is a graph showing a relationship between a coherency in a recording mode and a light quantity of a recorded hologram.

FIG. 15 is a graph showing results when a relationship between a coherency in the recording mode and a light quantity of hologram recorded in the same mode is measured. Similarly to FIG. 14, an abscissa axis represents a contrast ratio as a value having a correlation with the coherency. An ordinate axis in the graph represents a diffraction light quantity reproduced with the reference light and normalized with a maximum value. In this case, a plurality of holograms was recorded by changing the contrast ratio, and each diffraction light quantity for each hologram was measured. It will be seen from FIG. 15 that a difference in optical path length between the reference light and the signal light, and thus a constant quality of hologram can be recorded even for any contrast ratio, since, when optical path length difference is 0 mm, a correlation between the contrast ratio and the diffraction light quantity is weak. However, it will be seen that a correlation between the contrast ratio and the diffraction light quantity is very strong when the optical path length difference is shifted to the minus side or to plus side, and the diffraction light quantity is reduced when the contrast ratio is decreased. Thus, when consideration is paid to variations in the optical path length difference during the apparatus manufacture or to a disturbance in the recording mode, a high coherency is required in the recording mode.

A strong correlation appears between the contrast ratio and the diffraction light quantity when there is an optical path length difference between the reference light and the signal light in the recording mode. The reason therefore can be considered as follows. A high coherency light has a long distance along which a light wave having a continuous phase and a low coherency light has a short distance along which a light wave having a continuous phase. When there is no optical path length difference between the reference light and the signal light, the light is once separated into the signal light and the reference light. When the signal light and the reference light are again interfered, the same waves interfere on a time basis. Thus, even when the coherency is low, there is no fluctuation in the interference fringes. When there is an optical path length difference between the reference light and the signal light, however, the light is once separated into the reference light and the signal light and when the reference light and the signal light again interferes each other, light waves of different time interfere. Therefore, when the coherency is low, a phase relationship between the signal light and the reference light varies and the position of the interference fringes fluctuates. When such fluctuations take place during a recording exposure time, the interference fringes cannot have a sufficient contrast and the intensity of the hologram is reduced.

Figure 1:
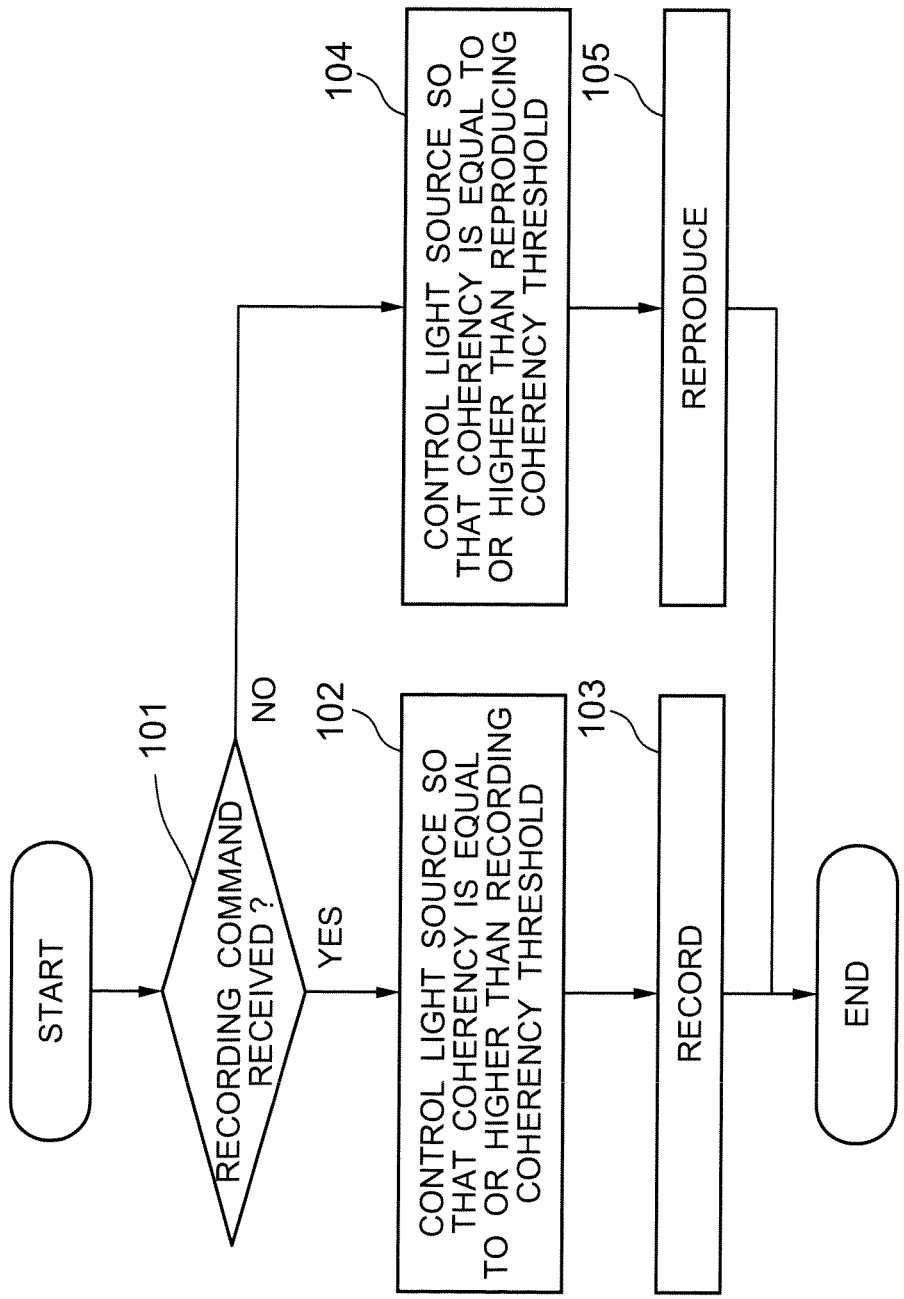
FIG. 1 shows an example of a flow of operations in a recording/reproducing process in an embodiment 1.

FIG. 1 shows an example of a flow of recording/reproducing operations in the embodiment 1. The optical information recording/reproducing apparatus 10, after receiving a control command from the external control device 91, determines the type of the command (step 101). When the apparatus determines that the command is a recording command at the step 101, the apparatus controls the coherency controller of the external resonator type variable wavelength laser 301 in such a manner that the coherency becomes equal or higher than the recording coherency (step 102). When the coherency controller now controls the current controller or the wavelength controller to fine adjust a current flowing through the semiconductor laser or the angle of the diffraction grating, the coherency is varied and the then-varied coherency is detected by the coherency detector, and, when the detected coherency is equal to or higher the recording coherency, the apparatus terminates the coherency control. When the detected coherency is smaller than the recording coherency, the current controller or the wavelength controller is repetitively controlled again so that the detected coherency becomes equal to or higher than the recoding coherency. Thereafter, the apparatus performs recording operation (step 103) and terminates its processing operation. When the command is other than the recording command at the step 101, the coherency controller of the external resonator type variable wavelength laser 301 is controlled so that the coherency becomes equal to or higher than the reproducing coherency (step 104). Thereafter, the apparatus perform reproducing operation (step 105) and terminates its operation. In this case, as the recording and reproducing coherencies, contrast ratios having a correlation with the coherency can be used. As an example, a contrast ratio of 0.55 can be used as the recording coherency, and a contrast ratio of 0.10 can be used as the reproducing coherency. In this connection, so long as the recoding coherency is higher than the reproducing coherency, however, the contrast ratio is not limited especially to these values. For example, a contrast ratio of 0.00 may be used as the reproducing coherency. In this connection, it is preferable that the external resonator type variable wavelength laser used in this specification oscillate in a single mode different from a multi-mode. The laser may oscillate in the single mode in the recording and reproducing modes.

As mentioned above, in order to increase the reduced coherency, the coherency controller of the external resonator type variable wavelength laser 301 is controlled. This involves a problem that a power or wavelength is fluctuated. However, since a low coherency can be allowed in the reproducing mode in the present invention, reproducing operation can be carried out with a desired power and wavelength, enabling enhancement of a signal quality in the reproducing mode.

In this connection, since the timing of switching the coherency may be set at the timing of switching between recording and the reproducing operation, the coherency switching is necessarily required to be the timing of receiving the recording command. For example, the coherency switching may be set at the timing of, for example, receiving a trial writing command or a reproducing command. The switching timing after reception of the recording command may be within duration after reception of the recording command until the signal light and reference light are applied for the recording. For this reason, the command switching is necessarily required to be carried out immediately after the reception of the recording command. For example, the command switching may be carried out during seeking operation for the recording or immediately after the seeking operation, during procuring operation or immediately after the procuring operation.

A prior art optical information recording/reproducing apparatus based on holography has a problem that the power or wavelength of a light source is fluctuated in a reproducing mode. According to the first embodiment mentioned above, however, since setting a coherency required in the reproducing mode to be lower than a coherency required in the recording mode enables reduction of the fluctuations of the power and wavelength in the reproducing mode, there can be provided a reliable optical information recording/reproducing apparatus.

Setting of the coherency required in the reproducing mode than the coherency required in the recording mode also enables a reproduction start time to be made higher.

Embodiment 2

A second embodiment of the present invention will be explained by referring to the attached drawings. Since the arrangement of an optical information reproducing device is similar to that in the first embodiment, explanation thereof is omitted.

As an optical information recording medium for used in the optical information recording/reproducing apparatus based on holography, photopolymer is a promising material. The photopolymer material has a high linear expansion coefficient and expansion or shrinkage takes place in the material as the temperature is changed. Further the material is shrunk in the recording mode because monomer is converted to polymer in the recording mode. When such expansion or shrinkage takes place, the interval or tilt of interference fringes of the recorded hologram, this involves a problem that a signal quality in the reproducing mode is reduced. To solve this problem, a method of optimizing the angle and wavelength of the reference light for its compensation is generally known. In this case, in order to secure the signal quality in the reproducing mode, highly accurate wavelength setting is required. For example, it becomes necessary to set wavelengths in such a small wavelength shift state as shown in FIGS. 13A and 13B. Meanwhile, even if a wavelength shift occurs in the recording mode, optimization of the wavelength in the reproducing mode enables reproduction with a sufficient high signal quality.

Figure 16:
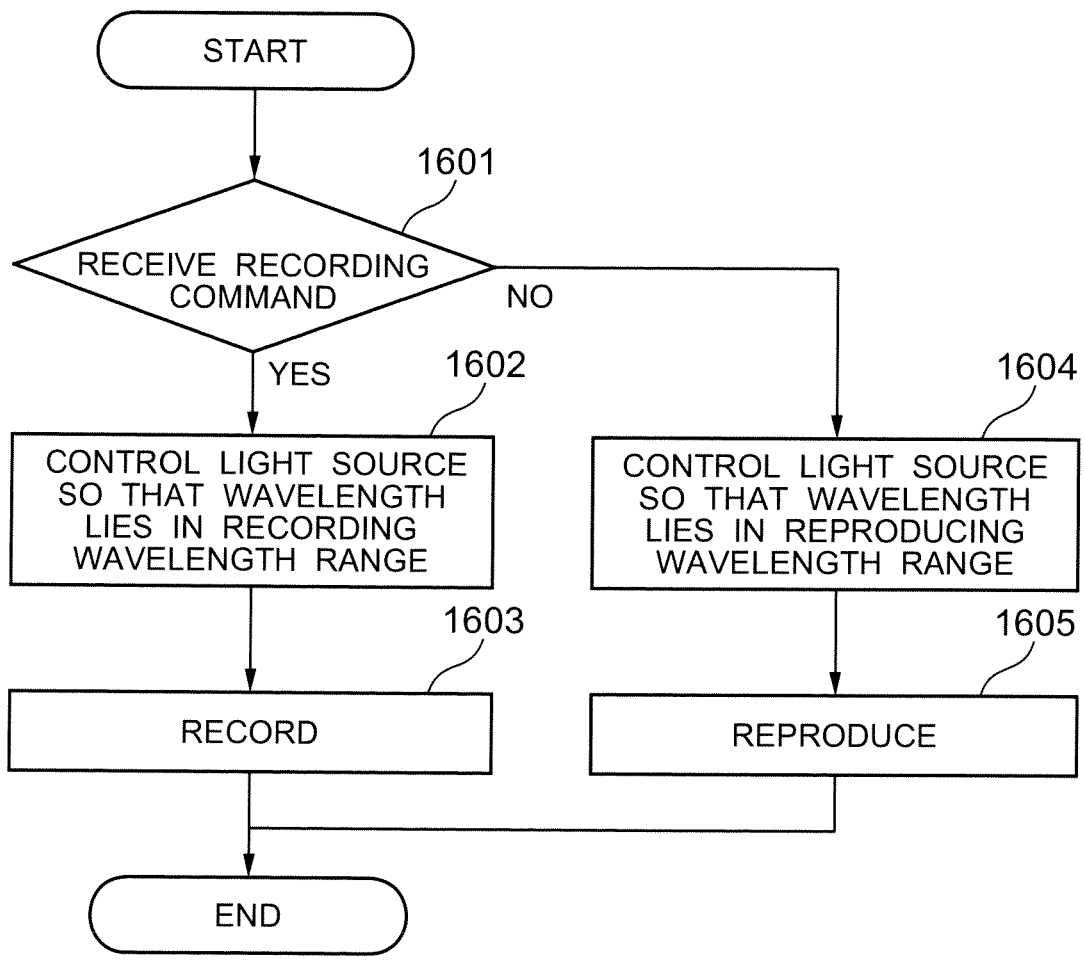
FIG. 16 shows an example of a flow of operations in a recording/reproducing process in an embodiment 2.

FIG. 16 shows an example of a flow of recording/reproducing operations in the embodiment 2. The optical information recording/reproducing apparatus 10, after receiving a control command, determines the type of the command (step 1601). When determining at the step 1601 that the received command is a recording command, the apparatus controls a wavelength controller of the external resonator type variable wavelength laser 301 in such a manner that the wavelength lies in a recording wavelength range (step 1602). Thereafter, the apparatus performs recording operation (step 1603) and terminates its operation. When determining that the received command is a command other than the recording command, the apparatus controls the wavelength controller of the external resonator type variable wavelength laser 301 (step 1604). Thereafter, the apparatus performs reproducing operation (step 1605) and terminates its operation. As an example, the recording wavelength range can be set within a range of ±0.10 nm and the reproducing wavelength range can be set within a range of ±0.05 nm. However, the reproducing and recording wavelength ranges are not limited especially to these ranges, so long as the reproducing wavelength range is narrower than the recording wavelength range. For example, the reproducing wavelength range may be fixed at 0.00 nm and thus the wavelength is fixed at such a fixed value.

A prior art optical information recording/reproducing apparatus based on holography has a problem that the wavelength of a light source is fluctuated in the reproducing mode. According to the second embodiment, however, the fluctuation of the wavelength in the reproducing mode can be reduced by setting the wavelength range required in the reproducing mode to be narrower than the wavelength range required in the recording mode. Thus, there can be provided a reliable optical information recording/reproducing apparatus.

Embodiment 3

A third embodiment of the present invention will be explained by referring to the attached drawings. The arrangement of the optical information reproducing device is similar to that in the first embodiment, and thus explanation thereof is omitted.

As explained in the embodiments 1 and 2, a high coherency is required in the recording mode and a high wavelength set accuracy is required in the reproducing mode.

Figure 17:
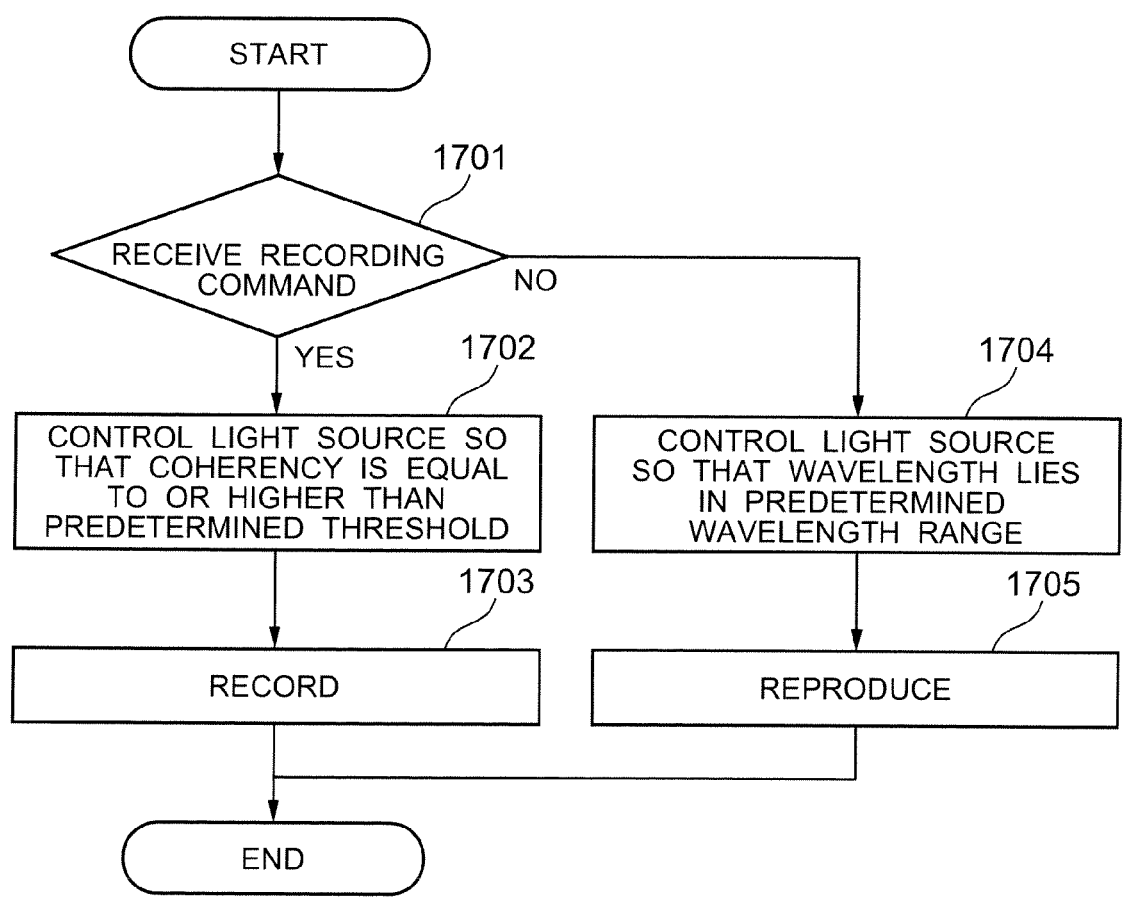
FIG. 17 shows an example of a flow of operations in a recording/reproducing process in an embodiment 3.

FIG. 17 shows an example of a flow of recording/reproducing operations in the embodiment 3. The optical information recording/reproducing apparatus 10, after receiving a control command, determines the type of the received command (step 1701). When determining at the step 1701 that the received command is a recording command, controls the coherency controller of the external resonator type variable wavelength laser 301 in such a manner that the coherency becomes equal to or higher than a predetermined threshold value (step 1702). Thereafter, the apparatus performs the recording operation (step 1703) and terminates its operation. When determining at the step 1701 that the received command is a command other than the recording command, the apparatus controls the wavelength controller of the external resonator type variable wavelength laser 301 in such a manner that the wavelength lies in a predetermined wavelength range (step 1704). Thereafter, the apparatus performs the reproducing operation (step 1705) and terminates its operation. As an example, the coherency in the recording mode can be set at a contrast ratio equal to or higher than 0.55; and the wavelength range in the reproducing mode can be set to be within a range of ±0.05 nm. However, the wavelength range is not limited especially to such values.

A prior art optical information recording/reproducing apparatus based on holography has a problem that the wavelength of a light source is fluctuated in the reproducing mode. According to the aforementioned third embodiment, signal qualities in the recording and reproducing mode can be secured by controlling the light source in the recording mode in such a manner that the coherency becomes equal to or higher a predetermined threshold value and by controlling the light source in the reproducing mode in such a manner that the wavelength lies in a predetermined wavelength range. Thus, there can be provided a reliable optical information recording/reproducing apparatus.

Such an arrangement may also be employed that a coherency in the recording mode is set to be higher than a coherency in the reproducing mode and a wavelength set accuracy range in the reproducing mode is set to be narrower than that in the recording mode. In this case, since the fluctuation of the wavelength in the reproducing mode can be reduced, there can be provided a reliable optical information recording/reproducing apparatus and a reproduction start time can be made faster.

Embodiment 4

Explanation will be made as to a fourth embodiment of the present invention with reference to the attached drawings. The arrangement of the optical information reproducing device is similar to that in the first embodiment, and explanation thereof is omitted.

Figure 18:
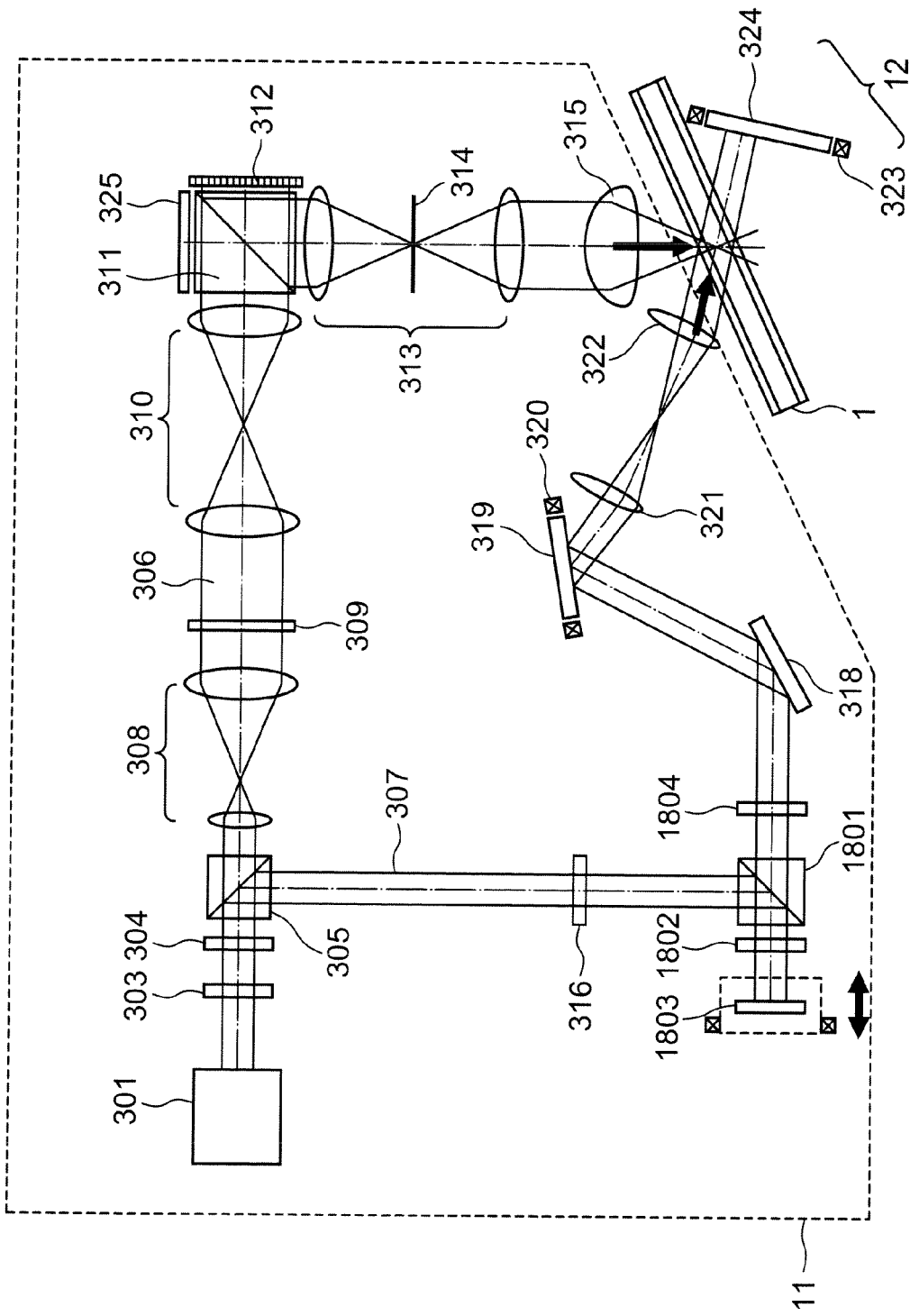
FIG. 18 schematically shows an example when an optical path length difference adjustment mechanism is added to a pickup in an embodiment 4.

FIG. 18 shows an example in which a mechanism for adjusting an optical path length difference between the signal light and the reference light is added in FIG. 3 showing an optical system arrangement of the pickup 11 in the optical information recording/reproducing apparatus 10.

The reference light 307, which form an S polarization, is reflected by a PBS prism 1801. The reflected light is set as a circularly polarized wave light by a polarization direction conversion element 1802 formed as a ¼ wavelength plate or the like, reflected by a mirror 1803, and then passed again through the polarization direction conversion element 1802 to be thereby formed as a P polarization light. The reference light 307 formed as the P polarization light is passed through the PBS prism 1801 and then through a polarization direction conversion element 1804 formed as a ½ wavelength plate or the like to thereby combine the signal light and the polarization light. In this case, when the position of the optical axis of the mirror 1803 is adjusted, the optical path length of the reference light can be adjusted, and, when an optical path length difference to the signal light is removed, recording less influenced by the fluctuations of the coherency can be achieved. By locating a mechanism for adjusting the optical path length difference of the present embodiment at a position where the reference light of FIG. 3 is reflected at a right angle, the adjusting mechanism can be added with a minimum number of components.

Figure 19:
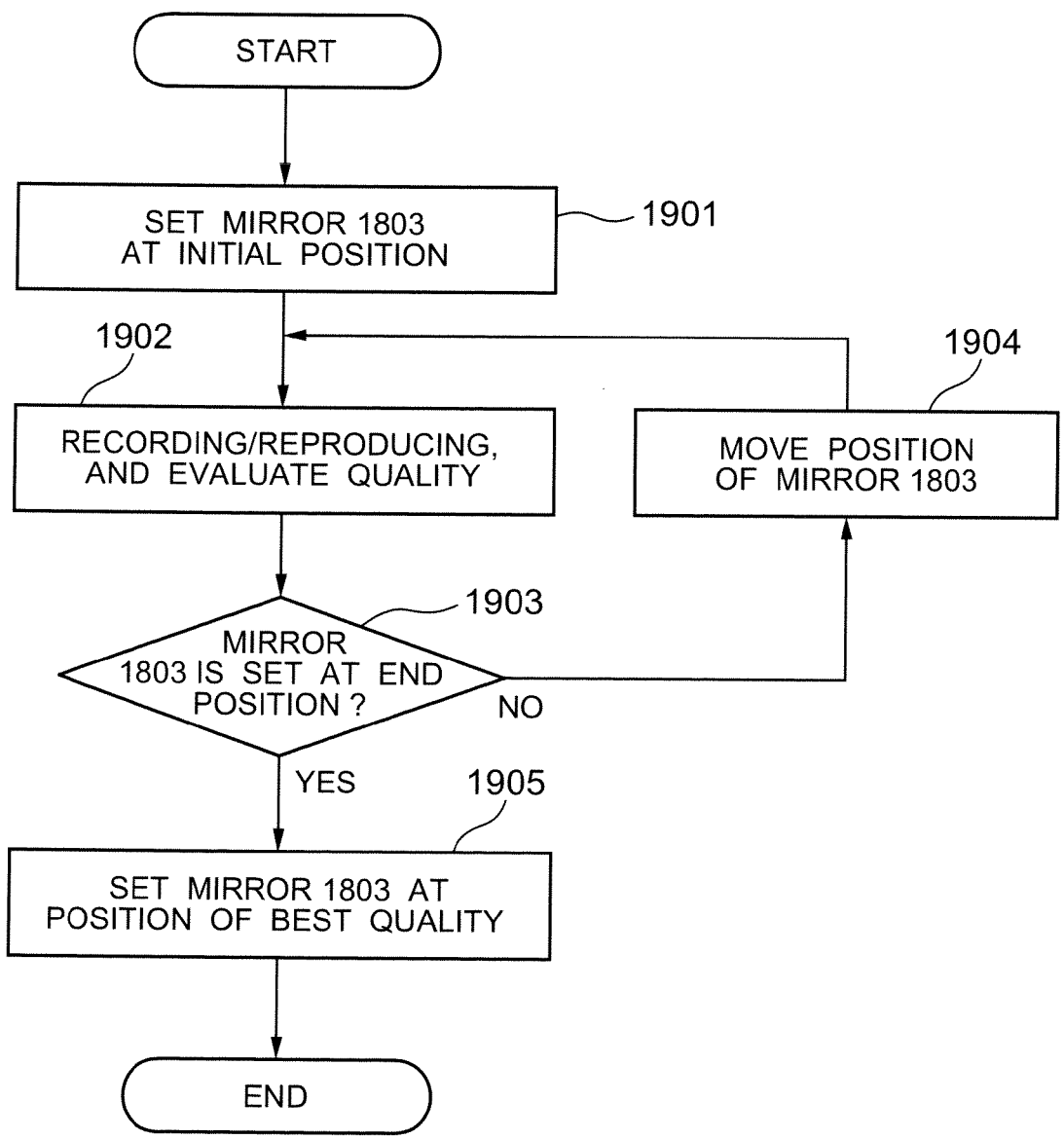
FIG. 19 shows an example of a flow of adjusting operations of an optical path length difference in the embodiment 4.

FIG. 19 shows an example of a flow of adjusting operations in the optical path length difference adjustment mechanism in the optical information recording/reproducing apparatus 10. The optical information recording/reproducing apparatus 10 sets the mirror 1803 at its initial position (step 1901). The apparatus then performs recording/reproducing operation to evaluate the quality of the recorded hologram (step 1902). The quality may be employed as the quality of diffraction light or as the quality of the signal obtained by the signal processing operation. The apparatus next determines whether or not the position of the mirror 1803 is at its end position (step 1903). When determining that the position of the mirror 1803 is not at its end position, the apparatus moves the mirror 1803 (step 1904). Thereafter, the apparatus performs again the recording/reproducing operation to evaluate the quality. When determining that the position of the mirror 1803 is at its end position, the apparatus refers to a quality acquired for the position of the mirror and sets the position of the mirror 1803 at a position corresponding to the best quality and terminates its adjusting operation. The position corresponding to the best quality may also be obtained, for example, by finding a position corresponding to the maximum diffraction light quantity or by finding a position corresponding to the best signal quality.

The present embodiment has an advantage that even addition of a mechanism for adjusting the optical path length minimizes a shift in the optical axis because the same optical axis is used before the adjustment.

In the present embodiment, the mechanism for adjusting an optical path length difference was added in the optical path of the reference light. When the optical path length of the signal light is longer than the optical path length of the reference light, however, a mechanism for adjusting an optical path length difference may be added in the optical path of the signal light.

Further, when any of the controls of the embodiments 1 to 3 is applied to the external resonator type variable wavelength laser 301, there can be provided a more reliable optical information recording/reproducing apparatus.

Embodiment 5

Explanation will be made as to a fifth embodiment of the present invention by referring to the attached drawings. The arrangement of the optical information reproducing device is similar to that in the first embodiment, and explanation thereof is omitted.

Figure 20:
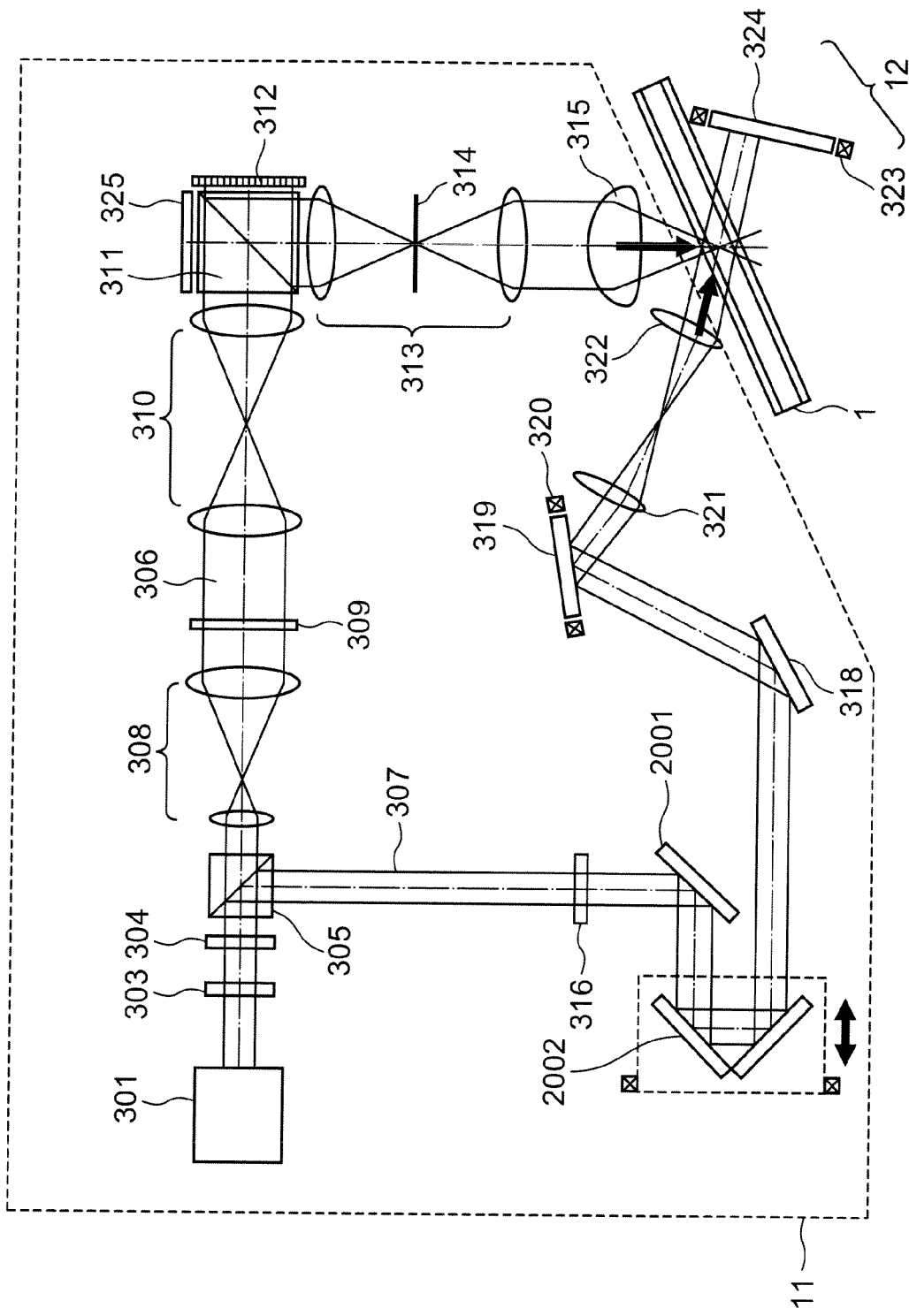
FIG. 20 schematically shows an embodiment when an optical path length difference adjustment mechanism is added to a pickup in an embodiment 5.

FIG. 20 is an embodiment different from the embodiment 4, in which a mechanism for adjusting an optical path length difference between the signal light and the reference light is added in FIG. 3 showing the arrangement of the optical system of the pickup 11 in the optical information recording/reproducing apparatus 10.

The reference light 307 is reflected by a mirror 2001, and reflected by a mirror 2002 twice at a right angle. In this case, when the position of the mirror 2002 is adjusted, the optical path length of the reference light can be adjusted, so that elimination of the optical path length difference to the signal light can be less influenced by the coherency fluctuation. Even in the present embodiment similarly to the embodiment 4, when a mechanism for adjusting an optical path length difference is located at a position where the reference light is reflected at a right angle of FIG. 3, the adjustment mechanism can be added with a minimum number of components.

In the adjustment flow, the mirror 2002 may be used in place of the mirror 1803 of FIG. 19. When any of the controls of the embodiments 1 to 3 is applied to the external resonator type variable wavelength laser 301, further, there can be provided a more reliable optical information recording/reproducing apparatus.

Since the present embodiment can be configured only using mirrors different from the embodiment 4, a mechanism can be added inexpensively.

In the present embodiment, the mechanism for adjusting an optical path length difference has been added in the optical path of the reference light. When the optical path length of the signal light is shorter than the optical path length of the reference light, however, a mechanism for adjusting an optical path length difference may be added in the optical path of the signal light.

The present invention is not limited to the aforementioned embodiments, and may include various variations or modifications thereof. For example, the above embodiments have been explained in detail for the purpose of easy understanding of the present invention. Thus the present invention is not necessarily limited to the above embodiments having all the arrangements mentioned above. Part of the arrangements of the embodiments may be replaced by the arrangement of the other embodiment, or the arrangement of one of the embodiments may be added to the arrangement of the other embodiment. Part of the arrangement of each embodiment may also be added to the arrangement of the other embodiment, removed, or replaced thereby.

The aforementioned each arrangement, function, processor, processing means, etc. may be implemented by hardware by designing part or all thereof in the form of, for example, an integrated circuit. Or the aforementioned each arrangement, function, processor, processing means, etc. may also be implemented by software by using a processor which interprets a program to execute each function. Information such as a program, a table, a file for executing each function may be placed in such a recording device as a memory, a hard disc, or an SSD (Sold State Drive) or in such a recording medium as an IC car, an SD card or a DVD.

Further, control lines and information lines have been illustrated as only the lines considered to be required for the sake of explanation, and thus all of such lines as required for manufacture of its product are not illustrated. In practical cases, we can say that substantially all of components are considered to be mutually connected.

The invention claimed is:

1. An optical information recording/reproducing apparatus for recording an interference pattern between signal light and reference light information-multiplexed as a hologram in an optical information recording medium and for reproducing information recorded in the optical information recording medium on the basis of the recorded hologram with use of the reference light, comprising:
 a light source for emitting light;
 a coherency detector for detecting a coherency of the light emitted from the light source; and
 a coherency controller for controlling the coherency of the light emitted from light source on the basis of a coherency value detected by the coherency detector, wherein
 the coherency controller switches between a coherency required in a recording mode and a coherency required in a reproducing mode.

2. An optical information recording/reproducing apparatus according to claim 1, wherein the coherency required in the recording mode is higher than the coherency required in the reproducing mode.

3. An optical information recording/reproducing apparatus according to claim 2, wherein the coherency value is defined with use of a contrast ratio.

4. An optical information recording/reproducing apparatus according to claim 1, wherein the light source oscillates in a single mode in the recording mode and in the reproducing mode.

5. An optical information recording/reproducing apparatus according to claim 1, wherein the coherency is controlled by a wavelength of the light emitted from the light source and by a current flowing through the light source.

6. An optical information recording/reproducing apparatus for recording an interference pattern between signal light and reference light information-multiplexed as a hologram in an optical information recording medium and for reproducing information recorded in the optical information recording medium on the basis of the recorded hologram with use of the reference light, comprising:
 a light source for emitting light;
 a wavelength detector for detecting a wavelength of the light emitted from the light source; and
 a wavelength controller for controlling the wavelength the light emitted from the wavelength detector on the basis of a wavelength value detected by the wavelength detector, wherein
 the wavelength controller switches between a wavelength set accuracy range required in a recording mode and a wavelength set accuracy range required in a reproducing mode.

7. An optical information recording/reproducing apparatus according to claim 6, wherein the wavelength set accuracy range required in the reproducing mode is narrower than the wavelength set accuracy range required in the recording mode.

8. An optical information recording/reproducing apparatus for recording an interference pattern between signal light and reference light information-multiplexed as a hologram in an optical information recording medium and for reproducing information recorded in the optical information recording medium on the basis of the recorded hologram with use of the reference light, comprising:
 a light source for emitting light;
 a coherency detector for detecting a coherency of the light emitted from the light source;
 a coherency controller for controlling the coherency of the light source on the basis of a coherency value detected by the coherency detector;
 a wavelength detector for detecting a wavelength of the light emitted from the light source; and
 a wavelength controller for controlling the wavelength the light emitted from the wavelength detector on the basis of a wavelength value detected by the wavelength detector, wherein
 the coherency controller is controlled so that the coherency of the light emitted from the light source is equal to or higher than a predetermined value in the recording mode, and the wavelength controller is controlled so that a wavelength set accuracy range of the light emitted from the light source lies in a predetermined range in the reproducing mode.

9. An optical information recording/reproducing apparatus according to claim 8, wherein the coherency value is defined with use of a contrast ratio.

10. An optical information recording/reproducing method of recording an interference pattern between signal light and reference light information-multiplexed as a hologram in an optical information recording medium and of reproducing information recorded in the optical information recording medium on the basis of the recorded hologram with use of the reference light, comprising the steps of:
   detecting coherencies of light used in the recording and reproducing modes;
   switching between the coherency required in the recording mode and the coherency required in the reproducing mode; and
   controlling the coherencies of the light used in the recording/reproducing modes on the basis of information on the detected coherencies.

* * * * *